Aug. 2, 1966 R. G. CROMLEIGH 3,264,458

SERIAL BINARY ADDER

Filed April 4, 1963 7 Sheets-Sheet 1

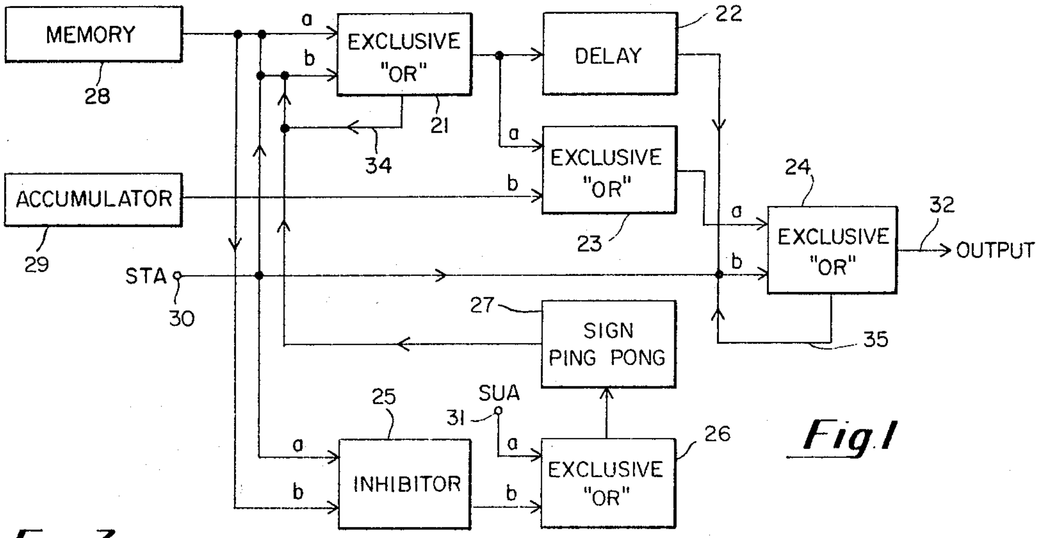

Fig. 1

Fig. 3

| TIME | $T_3$ | $T_4$ | $T_5$ | $T_6$ | $T_7$ | $T_8$ | $T_9$ | $T_{10}$ | $T_{11}$ | $T_{12}$ | $T_{13}$ | $T_{14}$ | $T_{15}$ | $T_{16}$ | $T_{17}$ | $T_{18}$ | $T_{19}$ | $T_{20}$ | $T_{21}$ | $T_{22}$ |
|---|---|---|---|---|---|---|---|---|---|---|---|---|---|---|---|---|---|---|---|---|
| n PULSES | | 1 | | 1 | | 1 | | 1 | | 1 | | 1 | | 1 | | 1 | | 1 | | 1 |
| n+1 PULSES | 1 | | 1 | | 1 | | 1 | | 1 | | 1 | | 1 | | 1 | | 1 | | 1 | |
| | | $P_0$ | | $P_1$ | | $P_2$ | | $P_3$ | | $P_4$ | | $P_5$ | | $P_6$ | | | | | | |
| INPUT WORD FROM MEMORY | | 0 | | 1 | | 1 | | 0 | | 1 | | 0 | | 1 | | | | | | |
| STA PULSE | | 1 | | | | | | | | | | | | | | | | | | |
| C101 | | 0 | | 1 | | 1 | | 0 | | 1 | | 0 | | 1 | | 0 | | 0 | | 0 |
| C103 | | 1 | | 1 | | 1 | | 1 | | 1 | | 1 | | 1 | | 1 | | 1 | | 1 |
| C122 | 0 | | 1 | | 0 | | 0 | | 1 | | 0 | | 1 | | 0 | | 1 | | 1 | |
| C102 | 0 | | 0 | | 0 | | 0 | | 0 | | 0 | | 0 | | 0 | | 0 | | 0 | |
| C104 | 0 | | 1 | | 0 | | 0 | | 1 | | 0 | | 1 | | 0 | | 1 | | 1 | |
| OUTPUT FROM C102 & C104 | | | | $P_0$ | | $P_1$ | | $P_2$ | | $P_3$ | | $P_4$ | | $P_5$ | | $P_6$ | | | | |
| ON LINE X 104 | | 0 | | 1 | | 0 | | 0 | | 1 | | 0 | | 1 | | 0 | | 1 | | 1 |
| C117 | | 1 | | | | | | | | | | | | | | | | | | |
| C120 | | 0 | | 1 | | 1 | | 0 | | 1 | | 0 | | 1 | | 0 | | 0 | | 0 |
| C118 | 0 | | 1 | | 0 | | 0 | | 0 | | 0 | | 0 | | 0 | | 0 | | 0 | |
| C119 | | 0 | | 1 | | 0 | | 0 | | 0 | | 0 | | 0 | | 0 | | 0 | | 0 |
| C114 | 0 | | 0 | | 1 | | 1 | | 1 | | 1 | | 1 | | 1 | | 1 | | 1 | |
| C125 | | 0 | | 0 | | 1 | | 1 | | 1 | | 1 | | 1 | | 1 | | 1 | | 1 |
| C123 | | 0 | | 1 | | 0 | | 0 | | 1 | | 0 | | 1 | | 0 | | 1 | | 0 |
| C106 | 0 | | 0 | | 1 | | 0 | | 0 | | 1 | | 0 | | 1 | | 0 | | 1 | |
| C105 | | 0 | | 1 | | 0 | | 0 | | 1 | | 0 | | 1 | | 0 | | 1 | | 1 |
| C115 | | 1 | | 1 | | 1 | | 1 | | 1 | | 1 | | 1 | | 1 | | 1 | | 1 |
| C124 | 0 | | 1 | | 0 | | 1 | | 1 | | 0 | | 1 | | 0 | | 1 | | 0 | |
| C110 | 0 | | 0 | | 0 | | 0 | | 0 | | 0 | | 0 | | 0 | | 0 | | 0 | |
| C116 | 0 | | 1 | | 0 | | 1 | | 1 | | 0 | | 1 | | 0 | | 1 | | 0 | |
| | | $P_{-2}$ | | $P_{-1}$ | | $P_0$ | | $P_1$ | | $P_2$ | | $P_3$ | | $P_4$ | | $P_5$ | | $P_6$ | | $P_7$ |
| OUTPUT WORD | | 0 | | 1 | | 0 | | 1 | | 1 | | 0 | | 1 | | 0 | | 1 | | 0 |

OUTPUT NUMBER

Fig. 1A

| TIME | $T_4$ | $T_5$ | $T_6$ | $T_7$ | $T_8$ | $T_9$ | $T_{10}$ | $T_{11}$ | $T_{12}$ | $T_{13}$ | $T_{14}$ |
|---|---|---|---|---|---|---|---|---|---|---|---|
| POSITION | $P_0$ | | $P_1$ | | $P_2$ | | $P_3$ | | $P_4$ | | $P_5$ |
| BIT | 1 | | 0 | | 1 | | 1 | | 0 | | 1 |

INVENTOR.
RALPH G. CROMLEIGH

BY [signature]

ATTORNEY

INVENTOR.
RALPH G. CROMLEIGH
BY Charles R. Lepchinsky
ATTORNEY

| TIME | $T_3$ | $T_4$ | $T_5$ | $T_6$ | $T_7$ | $T_8$ | $T_9$ | $T_{10}$ | $T_{11}$ | $T_{12}$ | $T_{13}$ | $T_{14}$ | $T_{15}$ | $T_{16}$ | $T_{17}$ | $T_{18}$ | $T_{19}$ | $T_{20}$ | $T_{21}$ | $T_{22}$ |
|---|---|---|---|---|---|---|---|---|---|---|---|---|---|---|---|---|---|---|---|---|
| n PULSES | | 1 | | 1 | | 1 | | 1 | | 1 | | 1 | | 1 | | 1 | | 1 | | 1 |
| n+1 PULSES | 1 | | 1 | | 1 | | 1 | | 1 | | 1 | | 1 | | 1 | | 1 | | 1 | |
| | | $P_0$ | | $P_1$ | | $P_2$ | | $P_3$ | | $P_4$ | | $P_5$ | | $P_6$ | | | | | | |
| INPUT WORD FROM MEMORY | | 1 | | 1 | | 1 | | 0 | | 1 | | 0 | | 1 | | | | | | |
| STA PULSE | | 1 | | | | | | | | | | | | | | | | | | |
| C101 | | 0 | | 1 | | 1 | | 0 | | 1 | | 0 | | 1 | | 0 | | 0 | | |
| C103 | | 1 | | 1 | | 0 | | 0 | | 0 | | 0 | | 0 | | 0 | | 0 | | |
| C122 | 0 | | 1 | | 0 | | 0 | | 0 | | 0 | | 0 | | 0 | | 0 | | 0 | |
| C102 | 0 | | 0 | | 0 | | 1 | | 0 | | 1 | | 0 | | 1 | | 0 | | 0 | |
| C104 | 0 | | 1 | | 0 | | 0 | | 0 | | 0 | | 0 | | 0 | | 0 | | 0 | |
| OUTPUT FROM C102 & C104 | | | | $P_0$ | | $P_1$ | | $P_2$ | | $P_3$ | | $P_4$ | | $P_5$ | | $P_6$ | | | | |
| ON LINE X104 | | 0 | | 1 | | 0 | | 1 | | 0 | | 1 | | 0 | | 1 | | 0 | | 0 |
| C117 | | 1 | | | | | | | | | | | | | | | | | | |
| C120 | | 1 | | 1 | | 1 | | 0 | | 1 | | 0 | | 1 | | | | | | |
| C118 | 0 | | 0 | | 0 | | 0 | | 0 | | 0 | | 0 | | 0 | | 0 | | 0 | |
| C119 | | 0 | | 0 | | 0 | | 0 | | 0 | | 0 | | 0 | | 0 | | 0 | | 0 |
| C114 | 0 | | 0 | | 0 | | 0 | | 0 | | 0 | | 0 | | 0 | | 0 | | 0 | |
| C125 | | 0 | | 0 | | 0 | | 0 | | 0 | | 0 | | 0 | | 0 | | 0 | | 0 |
| C123 | | 0 | | 1 | | 0 | | 1 | | 0 | | 1 | | 0 | | 1 | | 0 | | 0 |
| C106 | 0 | | 0 | | 1 | | 0 | | 1 | | 0 | | 1 | | 0 | | 1 | | 0 | |
| C105 | | 0 | | 1 | | 0 | | 1 | | 0 | | 1 | | 0 | | 1 | | 0 | | 0 |
| C115 | | 1 | | 1 | | 1 | | 1 | | 1 | | 1 | | 1 | | 1 | | 1 | | 1 |
| C124 | 0 | | 1 | | 0 | | 1 | | 0 | | 1 | | 0 | | 1 | | 0 | | 1 | |
| C110 | 0 | | 0 | | 0 | | 0 | | 0 | | 0 | | 0 | | 0 | | 0 | | 0 | |
| C116 | 0 | | 1 | | 0 | | 1 | | 0 | | 1 | | 0 | | 1 | | 0 | | 1 | |
| | | $P_{-2}$ | | $P_{-1}$ | | $P_0$ | | $P_1$ | | $P_2$ | | $P_3$ | | $P_4$ | | $P_5$ | | $P_6$ | | $P_7$ |
| OUTPUT WORD | | 0 | | 1 | | 0 | | 1 | | 0 | | 1 | | 0 | | 1 | | 0 | | 1 |

OUTPUT NUMBER

Fig. 4

| TIME | $T_4$ | $T_5$ | $T_6$ | $T_7$ | $T_8$ | $T_9$ | $T_{10}$ | $T_{11}$ | $T_{12}$ | $T_{13}$ | $T_{14}$ | $T_{15}$ | $T_{16}$ | $T_{17}$ | $T_{18}$ | $T_{19}$ | $T_{20}$ |
|---|---|---|---|---|---|---|---|---|---|---|---|---|---|---|---|---|---|
| n PULSES | 1 | | 1 | | 1 | | 1 | | 1 | | 1 | | 1 | | 1 | | 1 |
| n+1 PULSES | | 1 | | 1 | | 1 | | 1 | | 1 | | 1 | | 1 | | 1 | |
| | $P_0$ | | $P_1$ | | $P_2$ | | $P_3$ | | $P_4$ | | $P_5$ | | | | | | |
| INPUT FROM MEMORY | 0 | | 0 | | 1 | | 1 | | 0 | | 1 | | | | | | |
| | | | $P_1$ | | $P_2$ | | $P_3$ | | $P_4$ | | $P_5$ | | $P_6$ | | | | |
| INPUT FROM ACCUMULATOR | | | 1 | | 1 | | 0 | | 0 | | 0 | | 0 | | | | |
| OUTPUT FROM C102 & C104 | | | $P_0$ | | $P_1$ | | $P_2$ | | $P_3$ | | $P_4$ | | $P_5$ | | | | |
| ON LINE X104 | 0 | | 1 | | 1 | | 0 | | 0 | | 1 | | 0 | | 1 | | 1 |
| OUTPUT FROM C108 ON | | | | | $P_1$ | | $P_2$ | | $P_3$ | | $P_4$ | | $P_5$ | | $P_6$ | | |
| LINE X108 | 0 | | 0 | | 1 | | 1 | | 0 | | 0 | | 0 | | 0 | | |
| C105 | 0 | | 1 | | 0 | | 0 | | 0 | | 1 | | 0 | | 1 | | |
| C109 | 0 | | 0 | | 0 | | 1 | | 0 | | 0 | | 0 | | 0 | | |
| C123 | 0 | | 1 | | 0 | | 0 | | 0 | | 1 | | 0 | | 1 | | |
| C106 | | 0 | | 1 | | 0 | | 0 | | 0 | | 1 | | | | 1 | |
| C115 | 1 | | 1 | | 1 | | 1 | | 0 | | 0 | | 1 | | 1 | | |
| C124 | | 1 | | 0 | | 1 | | 0 | | 0 | | 0 | | 1 | | 0 | |
| C110 | | 0 | | 0 | | 0 | | 0 | | 0 | | 1 | | 0 | | 0 | |
| C116 | | 1 | | 0 | | 1 | | 0 | | 0 | | 0 | | 1 | | 0 | |
| | $P_{-2}$ | | $P_{-1}$ | | $P_0$ | | $P_1$ | | $P_2$ | | $P_3$ | | $P_4$ | | $P_5$ | | $P_6$ |
| OUTPUT | 0 | | 1 | | 0 | | 1 | | 0 | | 0 | | 1 | | 1 | | 0 |

OUTPUT NUMBER

Fig. 5

SERIAL BINARY ADDER

| TIME | $T_4$ | $T_5$ | $T_6$ | $T_7$ | $T_8$ | $T_9$ | $T_{10}$ | $T_{11}$ | $T_{12}$ | $T_{13}$ | $T_{14}$ | $T_{15}$ | $T_{16}$ | $T_{17}$ | $T_{18}$ | $T_{19}$ | $T_{20}$ |
|---|---|---|---|---|---|---|---|---|---|---|---|---|---|---|---|---|---|
| n PULSES | 1 | | 1 | | 1 | | 1 | | 1 | | 1 | | 1 | | 1 | | |
| n+1 PULSES | | 1 | | 1 | | 1 | | 1 | | 1 | | 1 | | 1 | | 1 | |
| | $P_0$ | | $P_1$ | | $P_2$ | | $P_3$ | | $P_4$ | | $P_5$ | | | | | | |
| INPUT FROM MEMORY | 1 | | 0 | | 1 | | 1 | | 0 | | 1 | | | | | | |
| | | | $P_1$ | | $P_2$ | | $P_3$ | | $P_4$ | | $P_5$ | | $P_6$ | | | | |
| INPUT FROM ACCUMULATOR | | | 1 | | 1 | | 0 | | 0 | | 0 | | 0 | | | | |
| OUTPUT FROM C102 & C104 | | | $P_0$ | | $P_1$ | | $P_2$ | | $P_3$ | | $P_4$ | | $P_5$ | | | | |
| ON LINE X104 | 0 | | 1 | | 1 | | 0 | | 1 | | 0 | | 1 | | 0 | | 0 |
| OUTPUT FROM C108 ON | | | | | $P_1$ | | $P_2$ | | $P_3$ | | $P_4$ | | $P_5$ | | $P_6$ | | |
| LINE X108 | 0 | | 0 | | 1 | | 1 | | 0 | | 0 | | 0 | | 0 | | 0 |
| C105 | 0 | | 1 | | 0 | | 0 | | 1 | | 0 | | 1 | | 0 | | 0 |
| C109 | | | | | 0 | | 1 | | 0 | | 0 | | 0 | | 0 | | 0 |
| C123 | 0 | | 1 | | 0 | | 0 | | 1 | | 0 | | 1 | | 0 | | 0 |
| C106 | | | | 1 | | 0 | | 0 | | 1 | | 0 | | 1 | | 0 | |
| C115 | 1 | | 1 | | 1 | | 1 | | 0 | | 1 | | 1 | | 1 | | 1 |
| C124 | | 1 | | 0 | | 1 | | 0 | | 0 | | 1 | | 0 | | 1 | |
| C110 | | 0 | | 0 | | 0 | | 0 | | 1 | | 0 | | 0 | | 0 | |
| C116 | | 1 | | 0 | | 1 | | 0 | | 0 | | 1 | | 0 | | 1 | |
| | $P_{-2}$ | | $P_{-1}$ | | $P_0$ | | $P_1$ | | $P_2$ | | $P_3$ | | $P_4$ | | $P_5$ | | $P_6$ |
| OUTPUT | 0 | | 1 | | 0 | | 1 | | 0 | | 1 | | 1 | | 0 | | 1 |

OUTPUT NUMBER

Fig. 6

| TIME | $T_4$ | $T_5$ | $T_6$ | $T_7$ | $T_8$ | $T_9$ | $T_{10}$ | $T_{11}$ | $T_{12}$ | $T_{13}$ | $T_{14}$ | $T_{15}$ | $T_{16}$ | $T_{17}$ | $T_{18}$ | $T_{19}$ | $T_{20}$ | $T_{21}$ | $T_{22}$ |
|---|---|---|---|---|---|---|---|---|---|---|---|---|---|---|---|---|---|---|---|
| n PULSES | 1 | | 1 | | 1 | | 1 | | 1 | | 1 | | 1 | | 1 | | 1 | | 1 |
| n+1 PULSES | | 1 | | 1 | | 1 | | 1 | | 1 | | 1 | | 1 | | 1 | | 1 | |
| | $P_0$ | | $P_1$ | | $P_2$ | | $P_3$ | | $P_4$ | | $P_5$ | | $P_6$ | | | | | | |
| INPUT FROM MEMORY | 1 | | 0 | | 0 | | 1 | | 1 | | 0 | | 0 | | | | | | |
| | | | $P_1$ | | $P_2$ | | $P_3$ | | $P_4$ | | $P_5$ | | $P_6$ | | $P_7$ | | | | |
| INPUT FROM ACCUMULATOR | | | 0 | | 1 | | 0 | | 1 | | 1 | | 0 | | 0 | | | | |
| OUTPUT FROM C102 & C104 | | | $P_0$ | | $P_1$ | | $P_2$ | | $P_3$ | | $P_4$ | | $P_5$ | | $P_6$ | | | | |
| ON LINE X104 | 0 | | 1 | | 1 | | 1 | | 0 | | 1 | | 0 | | 0 | | 0 | | |
| OUTPUT FROM C108 ON | | | | | $P_1$ | | $P_2$ | | $P_3$ | | $P_4$ | | $P_5$ | | $P_6$ | | $P_7$ | | |
| LINE X108 | 0 | | 0 | | 0 | | 1 | | 0 | | 1 | | 1 | | 0 | | 0 | | |
| C105 | 0 | | 1 | | 1 | | 0 | | 0 | | 0 | | 0 | | 0 | | 0 | | 0 |
| C109 | 0 | | 0 | | 0 | | 0 | | 0 | | 0 | | 1 | | 0 | | 0 | | 0 |
| C123 | 0 | | 1 | | 1 | | 0 | | 0 | | 0 | | 0 | | 0 | | 0 | | 0 |
| C106 | | | | 1 | | 1 | | 0 | | 0 | | 0 | | 0 | | 0 | | 0 | |
| C115 | 1 | | 1 | | 1 | | 1 | | 1 | | 1 | | 1 | | 0 | | 0 | | |
| C124 | | 1 | | 0 | | 0 | | 1 | | 1 | | 1 | | 0 | | 0 | | 0 | |
| C110 | | 0 | | 0 | | 0 | | 0 | | 0 | | 0 | | 0 | | 0 | | 0 | |
| C116 | | 1 | | 0 | | 0 | | 1 | | 1 | | 1 | | 0 | | 0 | | 0 | |
| | $P_{-2}$ | | $P_{-1}$ | | $P_0$ | | $P_1$ | | $P_2$ | | $P_3$ | | $P_4$ | | $P_5$ | | $P_6$ | | $P_7$ |
| OUTPUT | 0 | | 1 | | 0 | | 0 | | 1 | | 1 | | 1 | | 0 | | 0 | | 0 |

OUTPUT NUMBER

Fig. 7

*INVENTOR.*
RALPH G. CROMLEIGH

BY Charles R. [signature]
ATTORNEY

SERIAL BINARY ADDER

Filed April 4, 1963 7 Sheets-Sheet 5

| TIME | $T_4$ | $T_5$ | $T_6$ | $T_7$ | $T_8$ | $T_9$ | $T_{10}$ | $T_{11}$ | $T_{12}$ | $T_{13}$ | $T_{14}$ | $T_{15}$ | $T_{16}$ | $T_{17}$ | $T_{18}$ | $T_{19}$ | $T_{20}$ | $T_{21}$ | $T_{22}$ |
|---|---|---|---|---|---|---|---|---|---|---|---|---|---|---|---|---|---|---|---|
| n PULSES | 1 | | 1 | | 1 | | 1 | | 1 | | 1 | 1 | 1 | | 1 | | 1 | | 1 |
| n+1 PULSES | | 1 | | 1 | | 1 | | 1 | | 1 | | 1 | | 1 | | 1 | | 1 | |
| | $P_0$ | | $P_1$ | | $P_2$ | | $P_3$ | | $P_4$ | | $P_5$ | | $P_6$ | | | | | | |
| INPUT FROM MEMORY | 0 | | 1 | | 0 | | 1 | | 1 | | 0 | | 1 | | | | | | |
| | | | $P_1$ | | $P_2$ | | $P_3$ | | $P_4$ | | $P_5$ | | $P_6$ | | $P_7$ | | | | |
| INPUT FROM ACCUMULATOR | | | 0 | | 1 | | 0 | | 1 | | 0 | | 1 | | 1 | | | | |
| OUTPUT FROM C102 & C104 | | | $P_0$ | | $P_1$ | | $P_2$ | | $P_3$ | | $P_4$ | | $P_5$ | | $P_6$ | | | | |
| ON LINE X104 | 0 | | 1 | | 0 | | 1 | | 0 | | 0 | | 1 | | 0 | | 1 | | 1 |
| OUTPUT FROM C108 ON | | | | | $P_1$ | | $P_2$ | | $P_3$ | | $P_4$ | | $P_5$ | | $P_6$ | | $P_7$ | | |
| LINE X108 | 0 | | 0 | | 0 | | 1 | | 0 | | 1 | | 0 | | 1 | | 1 | | 0 |
| C105 | 0 | | 1 | | 0 | | 0 | | 0 | | 0 | | 1 | | 0 | | 0 | | 0 |
| C109 | 0 | | 0 | | 0 | | 0 | | 0 | | 1 | | 0 | | 1 | | 0 | | 0 |
| C123 | 0 | | 1 | | 0 | | 0 | | 0 | | 0 | | 1 | | 0 | | 0 | | 0 |
| C106 | | 0 | | 1 | | 0 | | 0 | | 0 | | 0 | | 1 | | 0 | | 0 | |
| C115 | 1 | | 1 | | 1 | | 1 | | 1 | | 1 | | 0 | | 1 | | 0 | | 0 |
| C124 | | 1 | | 0 | | 1 | | 1 | | 1 | | 0 | | 0 | | 0 | | 0 | |
| C110 | | 0 | | 0 | | 0 | | 0 | | 0 | | 0 | | 1 | | 0 | | 0 | |
| C116 | | 1 | | 0 | | 1 | | 1 | | 1 | | 0 | | 0 | | 0 | | 0 | |
| | $P_{-2}$ | | $P_{-1}$ | | $P_0$ | | $P_1$ | | $P_2$ | | $P_3$ | | $P_4$ | | $P_5$ | | $P_6$ | | $P_7$ |
| OUTPUT | 0 | | 1 | | 0 | | 1 | | 1 | | 1 | | 0 | | 1 | | 0 | | 0 |

OUTPUT NUMBER

Fig. 8

| TIME | $T_4$ | $T_5$ | $T_6$ | $T_7$ | $T_8$ | $T_9$ | $T_{10}$ | $T_{11}$ | $T_{12}$ | $T_{13}$ | $T_{14}$ | $T_{15}$ | $T_{16}$ | $T_{17}$ | $T_{18}$ | $T_{19}$ | $T_{20}$ | $T_{21}$ | $T_{22}$ |
|---|---|---|---|---|---|---|---|---|---|---|---|---|---|---|---|---|---|---|---|
| n PULSES | 1 | | 1 | | 1 | | 1 | | 1 | | 1 | | 1 | | 1 | | 1 | | 1 |
| n+1 PULSES | | 1 | | 1 | | 1 | | 1 | | 1 | | 1 | | 1 | | 1 | | 1 | |
| | $P_0$ | | $P_1$ | | $P_2$ | | $P_3$ | | $P_4$ | | $P_5$ | | $P_6$ | | | | | | |
| INPUT FROM MEMORY | 1 | | 1 | | 0 | | 1 | | 1 | | 1 | | 0 | | | | | | |
| | | | $P_1$ | | $P_2$ | | $P_3$ | | $P_4$ | | $P_5$ | | $P_6$ | | $P_7$ | | | | |
| INPUT FROM ACCUMULATOR | | | 0 | | 0 | | 1 | | 1 | | 0 | | 1 | | 1 | | | | |
| OUTPUT FROM C102 & C104 | | | $P_0$ | | $P_1$ | | $P_2$ | | $P_3$ | | $P_4$ | | $P_5$ | | $P_6$ | | | | |
| ON LINE X104 | 0 | | 1 | | 0 | | 0 | | 1 | | 1 | | 1 | | 0 | | 0 | | 0 |
| OUTPUT FROM C108 ON | | | | | $P_1$ | | $P_2$ | | $P_3$ | | $P_4$ | | $P_5$ | | $P_6$ | | $P_7$ | | |
| LINE X108 | 0 | | 0 | | 0 | | 0 | | 1 | | 1 | | 0 | | 1 | | 1 | | 0 |
| C105 | 0 | | 1 | | 0 | | 0 | | 0 | | 0 | | 1 | | 0 | | 0 | | 0 |
| C109 | 0 | | 0 | | 0 | | 0 | | 0 | | 0 | | 0 | | 1 | | 1 | | 0 |
| C123 | 0 | | 1 | | 0 | | 0 | | 0 | | 0 | | 1 | | 0 | | 0 | | 0 |
| C106 | | 0 | | 1 | | 0 | | 0 | | 0 | | 0 | | 1 | | 0 | | 0 | |
| C115 | 1 | | 1 | | 1 | | 1 | | 1 | | 1 | | 1 | | 1 | | 0 | | 0 |
| C124 | | 1 | | 0 | | 1 | | 1 | | 1 | | 1 | | 0 | | 0 | | 0 | |
| C110 | | 0 | | 0 | | 0 | | 0 | | 0 | | 0 | | 0 | | 0 | | 1 | |
| C116 | | 1 | | 0 | | 1 | | 1 | | 1 | | 1 | | 0 | | 0 | | 0 | |
| | $P_{-2}$ | | $P_{-1}$ | | $P_0$ | | $P_1$ | | $P_2$ | | $P_3$ | | $P_4$ | | $P_5$ | | $P_6$ | | $P_7$ |
| OUTPUT | 0 | | 1 | | 0 | | 1 | | 1 | | 1 | | 1 | | 0 | | 0 | | 1 |

OUTPUT NUMBER

Fig. 9

INVENTOR.
RALPH G. CROMLEIGH

BY [signature]
ATTORNEY

| TIME | $T_4$ | $T_5$ | $T_6$ | $T_7$ | $T_8$ | $T_9$ | $T_{10}$ | $T_{11}$ | $T_{12}$ | $T_{13}$ | $T_{14}$ | $T_{15}$ | $T_{16}$ | $T_{17}$ | $T_{18}$ | $T_{19}$ | $T_{20}$ | $T_{21}$ | $T_{22}$ |
|---|---|---|---|---|---|---|---|---|---|---|---|---|---|---|---|---|---|---|---|
| n PULSES | 1 | | 1 | | 1 | | 1 | | 1 | | 1 | | 1 | | 1 | | 1 | | 1 |
| n+1 PULSES | | 1 | | 1 | | 1 | | 1 | | 1 | | 1 | | 1 | | 1 | | 1 | |
| | $P_0$ | | $P_1$ | | $P_2$ | | $P_3$ | | $P_4$ | | $P_5$ | | $P_6$ | | | | | | |
| INPUT FROM MEMORY | 0 | | 1 | | 1 | | 1 | | 0 | | 1 | | 0 | | | | | | |
| | | | $P_1$ | | $P_2$ | | $P_3$ | | $P_4$ | | $P_5$ | | $P_6$ | | $P_7$ | | | | |
| INPUT FROM ACCUMULATOR | | | 1 | | 1 | | 0 | | 0 | | 1 | | 0 | | 1 | | | | |
| OUTPUT FROM C102 & C104 | | | $P_0$ | | $P_1$ | | $P_2$ | | $P_3$ | | $P_4$ | | $P_5$ | | $P_6$ | | | | |
| ON LINE X104 | 0 | | 1 | | 0 | | 0 | | 0 | | 1 | | 0 | | 1 | | 1 | | 1 |
| OUTPUT FROM C108 ON | | | | | $P_1$ | | $P_2$ | | $P_3$ | | $P_4$ | | $P_5$ | | $P_6$ | | $P_7$ | | |
| LINE X108 | 0 | | 0 | | 1 | | 1 | | 0 | | 0 | | 1 | | 0 | | 1 | | 0 |
| C105 | 0 | | 1 | | 0 | | 0 | | 0 | | 1 | | 0 | | 1 | | 0 | | 1 |
| C109 | 0 | | 0 | | 1 | | 1 | | 0 | | 0 | | 1 | | 0 | | 0 | | 0 |
| C123 | 0 | | 1 | | 0 | | 0 | | 0 | | 1 | | 0 | | 1 | | 0 | | 1 |
| C106 | | 0 | | 1 | | 0 | | 0 | | 0 | | 1 | | 0 | | 1 | | 0 | |
| C115 | 1 | | 1 | | 1 | | 0 | | 0 | | 0 | | 1 | | 0 | | 1 | | 1 |
| C124 | | 1 | | 0 | | 0 | | 0 | | 0 | | 0 | | 0 | | 0 | | 1 | |
| C110 | | 0 | | 0 | | 0 | | 1 | | 0 | | 1 | | 0 | | 1 | | 0 | |
| C116 | | 1 | | 0 | | 0 | | 0 | | 0 | | 0 | | 0 | | 0 | | 1 | |
| | $P_{-2}$ | | $P_{-1}$ | | $P_0$ | | $P_1$ | | $P_2$ | | $P_3$ | | $P_4$ | | $P_5$ | | $P_6$ | | $P_7$ |
| OUTPUT | 0 | | 1 | | 0 | | 0 | | 1 | | 0 | | 1 | | 0 | | 1 | | 1 |

OUTPUT NUMBER

Fig. 10

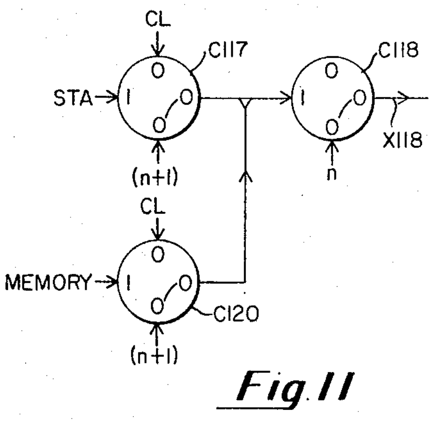

Fig. 11

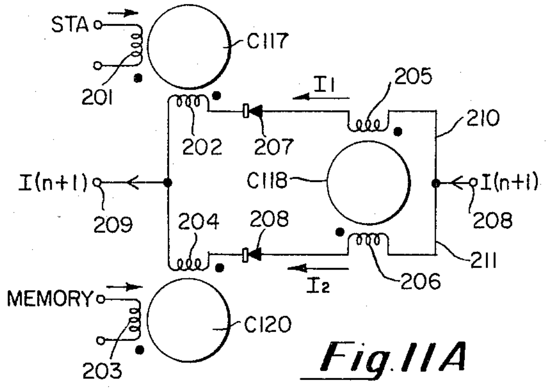

Fig. 11A

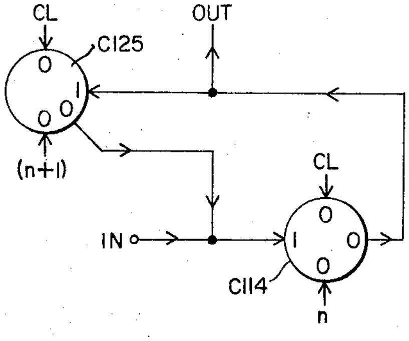

Fig. 12

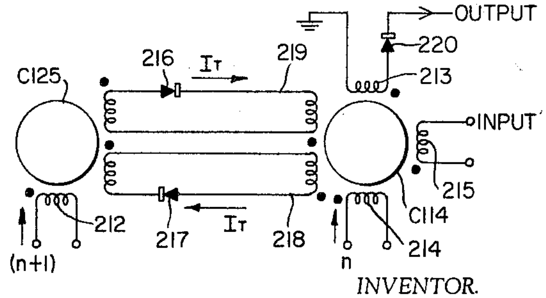

Fig. 12A

INVENTOR.
RALPH G. CROMLEIGH
BY
Charles R. Hepchinsky
ATTORNEY

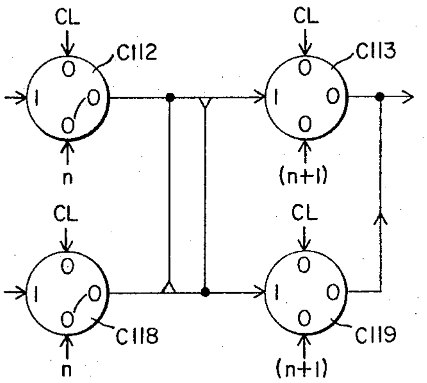
Fig. 13
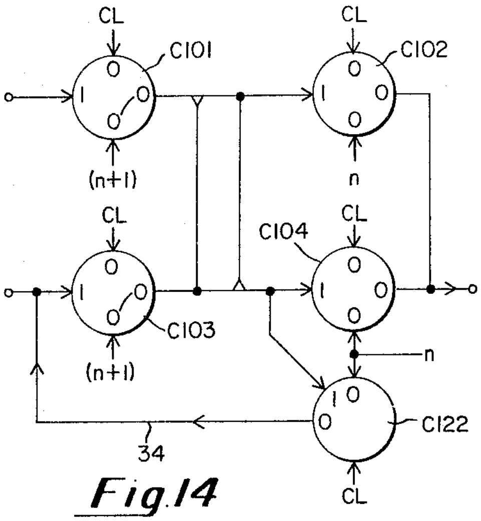
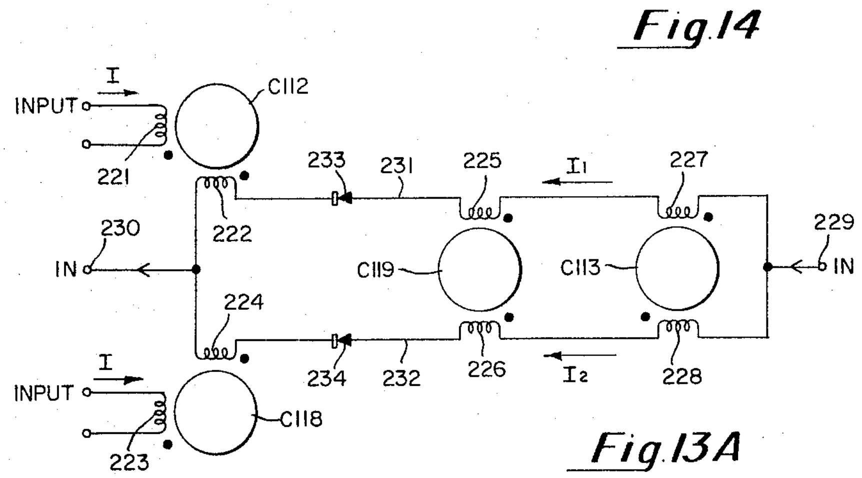
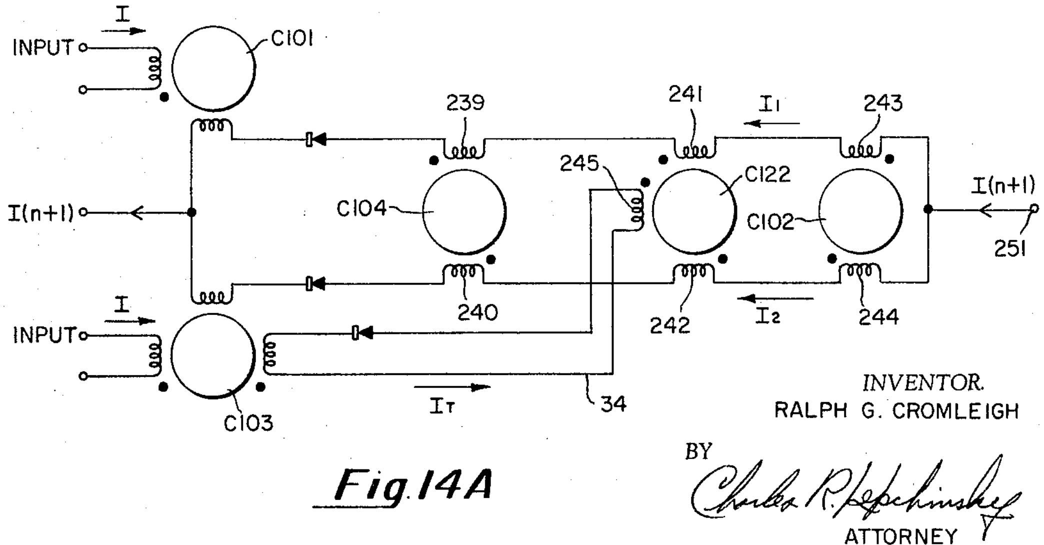
Fig. 14A
INVENTOR.
RALPH G. CROMLEIGH
BY Charles R. Hepchinsky
ATTORNEY United States Patent Office 3,264,458

Patented August 2, 1966

3,264,458

SERIAL BINARY ADDER

Ralph G. Cromleigh, La Canada, Calif., assignor to Burroughs Corporation, Detroit, Mich., a corporation of Michigan Filed Apr. 4, 1963, Ser. No. 270,625
16 Claims. (Cl. 235—176)

This invention relates to an algebraic adder and more particularly to a serial algebraic adder which utilizes bistable magnetic storage elements to effect mathematical computations in a novel and efficient manner.

Basic to a digital computer is that portion of the apparatus which performs the addition and subtraction of two binary numbers. It is the heart of the computer, for any mathematical operation whatsoever can be defined in terms of addition and subtraction. Accordingly, it is very desirable that the operation of the algebraic adder unit of a digital computer be reliable over a long period of time. Such reliability may be achieved by the use of a minimum number of highly reliable circuit elements such as bistable magnetic cores. Greater reliability may be achieved by the use of a serial adder instead of a parallel adder. A parallel adder requires a logic circuit for each so called number bit because each bit of the number occurs simultaneously in time. However, a serial adder requires only one logic circuit because the bits of a serial number occur successively in time. By minimizing the number of logic circuits required, the serial adder is more reliable than the parallel adder. The number of elements included in the serial adder may be reduced, thereby increasing its reliability, by utilizing the same elements for more than one function performed by the adder.

It is a general object of the present invention to provide an improved serial algebraic adder that utilizes bistable magnetic storage elements.

A more specific object of this invention is an improved serial algebraic adder that utilizes a minimum number of bistable magnetic storage elements.

Another object of this invention is an improved serial algebraic adder wherein time and equipment is minimized by overlapping the various functions performed by the adder and, with each circuit within the adder corresponding to a logical function, overlapping the circuits within the adder corresponding to the overlapping functions.

A further object of this invention is an improved serial algebraic adder that gives the sign value of the resulting output number.

A still further object of this invention is an improved serial algebraic adder that rounds off the resulting output number.

These and other objects, are achieved, in accordance with the present invention by utilizing magnetic core sign determining means that senses the sign of a number being serially placed into an algebraic adder unit from a first signal storage device such as a rotating magnetic drum. Once the sign of the incoming number has been determined, the sign determining means may be utilized to trigger a magnetic core shift register of the recirculating or end around type having a one-bit capacity. This device is analogous to the bistable or flip-flop circuits used in voltage level processing systems. It is often called, and is hereinafter referred to as, a ping-pong circuit. When the ping-pong circuit is triggered, it produces a series of pulses that occur simultaneously in time with the serial bits of the number arriving from the first signal storage means. Whether the ping-pong circuit is triggered by the sign determining means depends upon the function the adder is to perform, i.e., substraction or addition, and whether the incoming number from the first signal storage device is positive or negative.

The serial number from the first signal storage device is applied to a first input terminal of a first magnetic core EXCLUSIVE OR circuit and the output of the ping-pong circuit is applied to a second input terminal of the first EXCLUSIVE OR circuit. If the ping-pong circuit was triggered by the sign determining means, the output of the first EXCLUSIVE OR circuit is the ONE's complement of the number applied to the first input terminal of the first EXCLUSIVE OR circuit from the first signal storage device. If the ping-pong circuit was not triggered by the sign determining means, the first EXCLUSIVE OR circuit complements all of the least significant bits of the incoming number from the first signal storage device that are ZERO's prior to the first least significant ONE bit, and the first least significant ONE bit is also complemented. Thereafter, the remaining bits of the incoming number are unchanged by the first EXCLUSIVE OR circuit.

The number to be added to, or subtracted from, i.e., the number arriving from the first signal storage device is serially applied to a second input terminal of a second EXCLUSIVE OR circuit and arrives from a second signal storage device such as an accumulator. The output of the first EXCLUSIVE OR circuit is applied to the first input terminal of the second EXCLUSIVE OR circuit. The bits of the number arriving on the second input terminal of the second EXCLUSIVE OR circuit occur simultaneously in time with the corresponding bits arriving on the first input terminal of the second EXCLUSIVE OR circuit from the first EXCLUSIVE OR circuit.

The output of the first EXCLUSIVE OR circuit is also coupled, through delay means, to a second input terminal of a third EXCLUSIVE OR circuit and the output of the second EXCLUSIVE OR circuit is applied to a first input terminal of the third EXCLUSIVE OR circuit. The output of the algebraic adder is the output of the third EXCLUSIVE OR circuit. The delay means and the second and third EXCLUSIVE OR circuits function essentially as a full adder by adding the output of the first EXCLUSIVE OR circuit to the number applied to the algebraic adder from the second signal storage device.

If the result of the addition or subtraction performed by the algebraic adder is positive, the answer obtained from the output of the third EXCLUSIVE OR circuit is in absolute form. If the result is negative, the answer will appear on the output of the third EXCLUSIVE OR circuit in TWO's complement form.

A sign position bit is also part of the output of the algebraic adder and it indicates whether the sign of the answer number is negative or positive. Whether the sign position bit indicates that the answer number is positive or negative is a function of (a) whether the ping-pong was turned on, (b) the sign of the number supplied by the second signal storage means, and (c) the internal condition of the third EXCLUSIVE OR circuit at the time the sign position bit is generated.

A more detailed description follows with the accompanying drawings and claims in which:

FIG. 1 is a block diagram of a serial algebraic adder comprising a preferred embodiment of the present invention;

FIG. 1A is a symbolic representation of a sample number that is applied to one input of the algebraic adder of FIG. 1;

FIGS. 3, 4, 5, 6, 7, 8, 9 and 10 depict in tabular form the magnetic remanent state of cores in the algebraic adder of FIG. 2 for each time step in certain functions performed by the adder;

FIGS. 11 and 11A show in symbolic and schematic diagram form, respectively, an inhibitor circuit used in the algebraic adder of FIGS. 1 and 2;

FIGS. 12 and 12A show in symbolic and schematic diagram form, respectively, a ping-pong circuit used in the algebraic adder of FIGS. 1 and 2;

FIGS. 13 and 13A show in symbolic and schematic diagram form, respectively, an EXCLUSIVE OR circuit used in the algebraic adder of FIGS. 1 and 2;

FIGS. 14 and 14A show in symbolic and schematic diagram form, respectively, another EXCLUSIVE OR circuit used in the algebraic adder of FIGS. 1 and 2.

Figure 2:
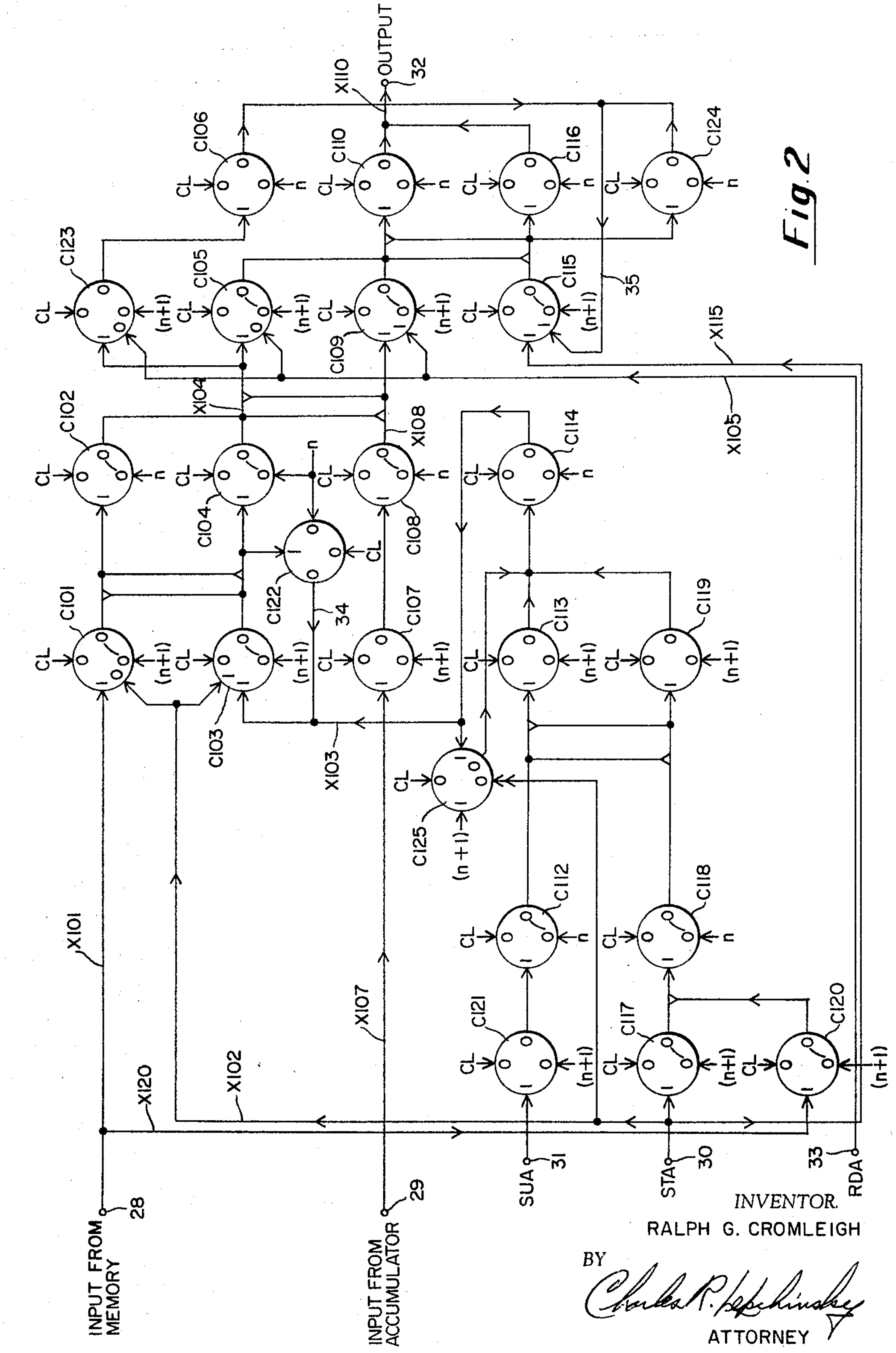
FIG. 2 is a symbolic schematic diagram of the serial algebraic adder of FIG. 1.

Basically, the present invention may be described as an algebraic adder used in conjunction with an accumulator loop.

The algebraic adder is a serial type full adder that forms the sum or difference of two data words in binary coded form. One of the data words is in absolute value form with its sign value preceding the least significant digit, and a zero following the most significant digit. The other word is in twos complement form with all of its digit positions being significant up to the sign position which follows the most significant digit. The adder produces the sum or difference of the above mentioned words in the form of a serial output in twos complement form with all digit positions significant up to the sign position which follows the most significant digit. This property permits the adder to be used in conjunction with the accumulator loop which serves both as a receiver of the adder output and as one of the inputs to the adder.

Binary arithmetic considerations show that the correct sum (in twos complement form with a sign following the most significant digit) will result from the addition of any combination of positive and negative numbers, so long as those numbers are in the same twos complement form. The sign is equal to one if the number is negative and zero if positive. Since the one input to the adding circuit coming from the output of the accumulator loop is already in the twos complement form, it only remains to convert the other input word to the algebraic added into its twos complement form.

It is a well known arithmetic exercise to show that subtraction is identical to addition except that the value of the sign of the subtrahend should be negated (changed) before the two numbers are added.

The twos complementing algorithms for binary coded words are as follows: If the word is positive do not change its form except to place a zero after the most significant digit; If the word is negative destroy the sign (which in the absolute value form of the word is in the position preceding the least significant digit), then leave all digit values unchanged from the least significant digit position up to and including the occurrence of the least significant ONE. Thereafter the negation of all digit values is formed, and a ONE placed in the twos complement form sign position (which follows the most significant digit). This operation is herein called modification, rather than complementing, since the twos complement form of a positive absolute word is identical to itself.

Reference to FIG. 1 which is a block diagram of the serial algebraic adder shows that the adder comprises a first EXCLUSIVE OR circuit 21, a second EXCLUSIVE OR circuit 23, a third EXCLUSIVE OR circuit 24, a fourth EXCLUSIVE OR circuit 26, delay means 22, an inhibitor circuit 25, and a ping-pong circuit 27. Each EXCLUSIVE OR circuit has a first (*a*) and a second (*b*) input terminal and a single output. The inhibitor circuit 25 also has a first (*a*) and a second (*b*) input terminal and a single output (*c*). The delay means 22 and the ping-pong circuit 27 has a single input and output. Both the first and third EXCLUSIVE OR circuits 21 and 24 respectively contain feedback from within the OR circuit to the second (*b*) input terminal.

The first input terminal (*a*) of the first EXCLUSIVE OR circuit 21 is coupled to a first source 28 of serial binary information i.e. numbers and to a source 30 of STA pulses. An STA (start) pulse is generated for each number supplied by the first source 28. The source 28 of serial binary numbers is a memory device such as a rotating magnetic drum. The serial binary number from the memory 28 is also applied to the second (*b*) input terminal of the inhibitor 25. The STA pulse source 30 is also coupled to the second (*b*) input terminal of the first EXCLUSIVE OR circuit 21, the second (*b*) input terminal of the third EXCLUSIVE OR circuit 24, and the first (*a*) input terminal of the inhibitor circuit 25.

The output of the inhibitor circuit 25 is coupled to the second (*b*) input terminal of the fourth EXCLUSIVE OR circuit 26 and the first (*a*) input terminal of the fourth EXCLUSIVE OR circuit 26 is coupled to a source of SUA pulses 31. An SUA (subtract) pulse is generated whenever the adder is to perform subtraction. The output of the fourth EXCLUSIVE OR circuit 26 is applied as an input to the ping-pong circuit 27 and the output of the ping-pong circuit 27 is applied to the second (*b*) input terminal of the first EXCLUSIVE OR circuit 21.

The output of the first EXCLUSIVE OR circuit 21 is applied to the first (*a*) input terminal of the second EXCLUSIVE OR circuit 23 and is also delayed by the delay means 22 before it enters the second (*b*) input terminal of the third EXCLUSIVE OR circuit 24. The first (*a*) input terminal of the second EXCLUSIVE OR circuit 23 is coupled to a second source 29 of serial binary information numbers which may be any suitable storage means such as an accumulator. The output of the second EXCLUSIVE OR circuit 23 is applied to the first (*a*) input terminal of the third EXCLUSIVE OR circuit 24. The output of the third EXCLUSIVE OR circuit 24 is the output of the adder and appears on line 32.

The operation of the second and fourth EXCLUSIVE OR circuits 23 and 26 are such that whenever a ONE bit (which is the presence of a pulse) is present on either the first (*a*) or second (*b*) input terminal, a ONE is produced on the output of the EXCLUSIVE OR circuit. Whenever a ONE pulse is present on both the first (*a*) and second (*b*) input terminals, a ZERO (which is the absence of a pulse) appears on the output of the EXCLUSIVE OR circuit. When a ZERO is present on both of the input terminals (*a*) and (*b*) a ZERO is produced on the output of the EXCLUSIVE OR circuit. The operation of the first and third EXCLUSIVE OR circuits 21 and 24 are substantially the same except that the feedback lines 34 and 35 will feedback a ONE pulse to the second (*b*) input terminal of the first and third EXCLUSIVE OR circuits 21 and 24 for the case of a ZERO having been applied to the first (*a*) input terminal and a ONE having been applied to the second (*b*) input terminal. For all other possible combinations of inputs there is no feedback.

The operation of the inhibitor circuit 25 is such that the presence of a ONE on the second (*b*) input terminal of the inhibitor will inhibit, i.e., prevent, the passage of a ONE through the inhibitor 25, that appears on the first (*a*) input terminal. Therefore, a ONE will appear on the output of the inhibitor 25 only when a ONE is present on the first (*a*) input terminal and a ZERO on the second (*b*) input terminal. For all other possible input combinations to the inhibitor 25, a ZERO appears as the output of the circuit. For example, when a ONE is applied to the second (*b*) input terminal and a ZERO is applied to the first (*a*) input terminal, a ZERO appears as the output of the circuit because the ONE on the second (*b*) input terminal only inhibits a ONE on the first (*a*) input terminal.

The operation of the ping-pong circuit 27 is such that whenever it receives a triggering ONE pulse from the fourth EXCLUSIVE OR circuit 26, it will produce a series of ONE pulses that occur simultaneously in time with the bits of the serial binary number arriving from the memory unit 28. The ping-pong 27 will continue to generate the ONE pulses until it is turned off. There is no output from the ping-pong circuit 27 until it is triggered by a ONE pulse from the fourth EXCLUSIVE OR circuit 26.

The operation of the delay means 22 is such that it will delay any bit applied to it for a sufficient length of time to permit a carry operation to take place.

FIG. 1A shows in symbolic form an illustrative example of a serial binary number that is placed into the adder by the memory unit 28. Reference to FIG. 1A will show that the number is made up of ONE's, that are the presence of a pulse and ZERO's that are the absence of a pulse. The individual ONE's and ZERO's of the binary number are called "bits." Each bit of the number occurs at an even numbered pulse time, i.e., at time $T_4$, $T_6$, $T_8$, etc. The first bit to arrive from the memory 28 is the $P_0$ position bit which occurs at time $T_4$. The $P_0$ bit indicates whether the serial binary number arriving from the memory 28 is negative or positive. If the $P_0$ bit is a ONE, the number has a negative sign and if the $P_0$ bit is a ZERO, the number has a positive sign. The next bit to arrive is the $P_1$ bit which occurs at time $T_6$ and is the least significant bit of the number arriving from the memory 28. The most significant bit of the number arrives last and occurs at time $T_{14}$. Therefore, the number shown in FIG. 1A would appear in absolute value form as:

| $P_0$ | $P_5$ | $P_4$ | $P_3$ | $P_2$ | $P_1$ |
|---|---|---|---|---|---|
| – | .1 | 0 | 1 | 1 | 0 |

The number is less than unity because the adder is not designed to properly handle an incoming number, or a result of addition or substraction, that is equal to or greater than unity. This in no way limits the capability of the adder for incoming numbers can be scaled down and the output of the adder correspondingly scaled up. The number shown in FIG. 1A contains five bits, excluding the $P_0$ sign position bit. The adder is not limited to a binary number containing this amount of bits but is capable handling a serial binary number containing any number of bits.

The number to be added to, or substracted from the number arriving from the memory 28 is supplied by the accumulator 29 and is in serial binary form. As will be shown herein below, the binary number arriving from the accumulator 29 does not have its sign indicating bit in the $P_0$ bit position. It occurs after the most significant bit position, in what would be the $P_6$ bit position occurring at time $T_{16}$ (not shown) of FIG. 1A.

The inhibitor 25 circuit and the fourth EXCLUSIVE OR circuit 26 will determine the sign of the number that is placed into the adder from the memory 28 and, depending upon whether the adder is to pass a single number from the memory 28, perform addition or subtraction, in ping-pong circuit 27 may, or may not, receive a trigger pulse from the fourth EXCLUSIVE OR circuit 26 and be turned on. If the ping-pong circuit 27 is triggered, the output of the first EXCLUSIVE OR circuit 21 will be the ONE's complement of the number supplied by the memory 28. On the other hand, if the ping-pong circuit 27 is not triggered, the first EXCLUSIVE OR circuit 21 will complement the least significant bits of the number arriving from the memory 28 that are ZERO's prior to the first least significant ONE bit, and also the first least significant ONE bit. Therefore, the remaining bits of the number will pass through the first EXCLUSIVE OR circuit unchanged. That is, the least significant ONE bit and all lower order ZERO's of the number are ONE's complemented if the number is negative.

The output of the first EXCLUSIVE OR circuit 21 will be added to a number arriving from the accumulator 29 in a circuit comprising the delay means 22, the second EXCLUSIVE OR circuit 23, and the third EXCLUSIVE OR circuit 24. The result of the addition will appear on lead 32, which is the output of the third EXCLUSIVE OR 24 circuit, in serial binary form and will contain a sign position bit that indicates the sign of the result. The sign position bit will be a ONE if the result is negative and a ZERO if it is positive. If the result is negative, the answer number will appear in TWO's complement form. The sign position bit is generated by the third EXCLUSIVE OR circuit 24 and is determined by the input to the first (*a*) input terminal of the third EXCLUSIVE OR circuit 24 from the second EXCLUSIVE OR circuit 23 (which, in turn, is determined by whether the ping-pong 27 is running and the sign of the word arriving from the accumulator 29) and by the input to the second (*b*) input terminal of the third EXCLUSIVE OR circuit 24 from the delay means 22, or the feedback on line 35.

*Detailed description*

FIG. 2 is a symbolic schematic diagram of the serial algebraic adder shown in FIG. 1 in block diagram form. The circles in FIG. 2 represent magnetic cores having a substantially rectangular hysteresis loop and having two stable remanent states indicated as a ONE and a ZERO, respectively. A line with an arrow pointing toward a circle represents an input to the core which sets it to the binary state (1 or 0) indicated just inside the circle directly opposite the arrowhead. A double arrowhead indicates that the existence of an input on that line will hold the core to that state despite the presence of other input signals.

Lines originating at a circle containing an arrowhead pointing away from the circle represent output circuits. A signal is present on the output line when the core is switched to the binary state shown nearest the line inside the circle. When an output may only be produced by one of several inputs, a curved line segment is drawn inside the circle from that input to the output such as is shown in cores $C_{101}$ and $C_{103}$. The symbols used in FIG. 2 are described in detail in the February 1956 issue of the Proceedings of the I.R.E. pages 154 to 162.

The first EXCLUSIVE OR circuit 21 of FIG. 1 comprises cores $C_{101}$, $C_{102}$, $C_{103}$, $C_{104}$ and $C_{122}$, the second EXCLUSIVE OR circuit 23 comprises cores $C_{104}$, $C_{105}$, $C_{108}$ and $C_{109}$, the third EXCLUSIVE OR circuit 24 comprises cores $C_{109}$, $_{110}$, $C_{115}$, $C_{116}$ and $C_{124}$, and fourth EXCLUSIVE OR circuit 26 comprises cores $C_{112}$, $C_{113}$, $C_{118}$ and $C_{119}$. The inhibitor circuit 25 shown in FIG. 1 comprises cores $C_{117}$ and $C_{118}$ and $C_{120}$. The ping-pong circuit 27 shown in FIG. 1 comprises cores $C_{114}$ and $C_{125}$. Cores $C_{107}$ and $C_{108}$ function to delay the number arriving from the accumulator 29 so that its bits occur simultaneously in time with the corresponding bits of the number from the memory 28 seen on line $X_{104}$ after passing through the first EXCLUSIVE OR circuit 21.

Reference to FIG. 2 will show that each core is advanced by a winding to which either an *n* pulse or an $(n+1)$ pulse is applied. An *n* pulse occurs at even pulse times such as times $T_4$, $T_6$, $T_8$, etc. and an $(n+1)$ pulse occurs at odd pulse times such as times $T_5$, $T_7$, $T_9$, etc.

*Sign determination*

Consider now the case of a single binary number arriving from the memory 28 to be passed through the adder. The adder must first determine the sign of the incoming number. Suppose the sign position bit $P_0$ is a ZERO, indicating the number is positive, and arrives from the memory at time $T_4$. Prior to the arrival of the $P_0$ sign bit, all of the cores of the adder will have been placed into the ZERO state.

FIG. 3 shows in tabular form a single positive word input from the memory 28. Referring now to FIGS. 2 and 3, when the $P_0$ bit arrives from the memory 28 at time $T_4$, it will be carried on line $X_{120}$ to the core $C_{120}$. Since $P_0$ is a ZERO (indicating the number is positive), core $C_{120}$ will remain in the ZERO state. Also at time $T_4$ an STA pulse occurs at terminal 30 which is applied to core $C_{117}$ and sets that core into the ONE state.

When the next $(n+1)$ pulse occurs at time $T_5$, the ONE in core $C_{117}$ will be transferred to core $C_{118}$. This transfer is not inhibited by core $C_{120}$ because a ZERO was in core $C_{120}$ at time $T_5$. At time $T_6$, the $n$ pulse applied to core $C_{118}$ will transfer the ONE from core $C_{118}$ into core $C_{119}$, and at time $T_7$ the $(n+1)$ pulse applied to core $C_{119}$ will transfer the ONE from core $C_{119}$ into core $C_{114}$. Then at time $T_8$, the $n$ pulse applied to core $C_{114}$ will transfer the ONE into core $C_{125}$. Cores $C_{114}$ and $C_{125}$ are connected in a ping-pong configuration. At time $T_7$, core $C_{114}$ is set as described, and at time $T_8$ $n$ pulse applied to core $C_{114}$ advances this ONE set as an output pulse on line $X_{103}$ to core $C_{103}$ and also sets core $C_{125}$. At time $T_9$, the ONE set of core $C_{125}$ is returned to core $C_{114}$ by the next $(n+1)$ pulse and the action described above continues, giving output pulses from the sign ping-pong during even pulse times starting with time $T_8$ and ending when the ping-pong circuit is turned off. Core $C_{121}$, $C_{112}$ and $C_{113}$ can be ignored, for as will be shown below, they only influence the turning on, or not turning on, of the ping-pong circuit when the adder is to perform subtraction.

Assume that the word arriving fom the memory 28 is negative. Then the $P_0$ sign position bit will be a ONE. At time $T_4$ a ONE will be placed into core $C_{120}$ by the $P_0$ bit and the STA pulse will place core $C_{117}$ into the ONE state. At time $T_5$ core $C_{118}$ will not be set into the ONE state because the ONE being advanced out of core $C_{117}$ is inhibited by the ONE in core $C_{120}$. Since a ONE is not set in core $C_{118}$, a ONE will not be advanced into core $C_{114}$ and the ping-pong will not be started.

Therefore, it has been shown that if $P_0$ is ZERO (a positive number) the ping-pong will be started and if $P_0$ is ONE (a negative number) the ping-pong will not be activated. The sign of the incoming word has been determined as the activation of the ping-pong (cores $C_{114}$ and $C_{125}$); going on if the number is positive, and off if the word is negative.

*Pass through of a single number*

The number shown in FIG. 3 arriving from the memory 28 would be written in absolute value form as:

| $P_0$ | $P_6$ | $P_5$ | $P_4$ | $P_3$ | $P_2$ | $P_1$ |
|---|---|---|---|---|---|---|
| + | .1 | 0 | 1 | 0 | 1 | 1 |

As explained above, the first bit $P_1$ to arrive from the memory 28 after the sign position bit $P_0$ is the least significant bit of the number. The most significant bit ($P_6$ for this number) arrives last at time $T_{16}$ for the number shown in FIG. 3.

Referring again to FIGS. 2 and 3, when the $P_0$ sign bit is applied to core $C_{120}$, it is also applied by way of line $X_{101}$ to core $C_{101}$ which, with cores $C_{102}$, $C_{103}$, $C_{104}$ and $C_{122}$ comprise the first EXCLUSIVE OR circuit 21. The bits of the incoming word occur at even numbered pulse times, i.e., the $P_0$ bit at time $T_4$, the $P_1$ bit at time $T_6$, etc. Notice again that the output from the sign ping-pong goes to core $C_{103}$ by way of line $X_{103}$ and that the sign ping-pong will be turned on at time $T_8$ because the incoming word is positive, i.e., the $P_0$ bit is a ZERO.

At time $T_4$, $P_0$ is applied into core $C_{101}$. The STA pulse also occurs at time $T_4$ and is applied to core $C_{101}$ by line $X_{102}$. Since $P_0$ is a ZERO (the absence of a pulse) and the presence of an STA pulse on line $X_{102}$ sets core $C_{101}$ into the ZERO state, core $C_{101}$ will remain in a ZERO state. At the same time, the STA pulse also sets core $C_{103}$ to the ONE state. The next $(n+1)$ pulse at time $T_5$ advances cores $C_{101}$ and $C_{103}$ thereby EXCLUSIVE ORing their contents which results in a ONE being set into cores $C_{104}$ and $C_{122}$ and a ZERO in core $C^{102}$. At time $T_6$, the next $n$ pulse causes the ONE in core $C_{104}$ to be read out and it appears on line $X_{104}$ as the output of the first EXCLUSIVE OR circuit 21 corresponding to the $P_0$ bit position. Also at time $T_6$ the $P_1$ bit, which is a ONE, enters core $C_{101}$ and the ONE in core $C_{122}$ is placed to core $C_{103}$ by way of lead 34. FIGURE 3 shows that the STA pulse occurs only one, at time $T_4$, for each number supplied by the memory 28.

The core $C_{122}$ and the lead 34 comprise the feedback loop of the EXCLUSIVE OR discussed earlier. Its operation is such that a ONE will be set into core $C_{122}$ and thereafter sent back into core $C_{103}$ when and only when a ONE appeared in core $C_{103}$ and a ZERO in core $C_{101}$.

At time $T_6$ the $P_1$ bit, which is a ONE, sets core $C_{101}$ to the ONE state. At time $T_7$, the ONE in core $C_{101}$ is EXCLUSIVE ORed with the ONE which was fed back into core $C_{103}$ from core $C_{122}$. This results in a ZERO being placed into cores $C_{102}$, $C_{104}$ and $C_{122}$. At time $T_8$, the next $n$ pulse will read out the ZERO in cores $C_{102}$ and $C_{104}$ and it will appear on line $X_{104}$ as a ZERO corresponding to the $P_1$ bit position. The outputs of cores $C_{102}$ and $C_{104}$ are tied together and appear on line $X_{104}$ as is shown in FIG. 2.

Also at time $T_8$, the $P_2$ bit which is a ONE is applied to core $C_{101}$ and sets that core to the ONE state. There was not a ONE in core $C_{122}$ to feedback into core $C_{103}$ at time $T_8$. However, as explained above, the sign ping-pong will be turned on for a positive number, i.e., $P_0$ is a ZERO, and the first output pulse from the ping-pong occurs at time $T_8$ and sets core $C_{103}$ in the ONE state. When the next $(n+1)$ pulse occurs at time $T_9$, the ONE in core $C_{101}$ is EXCLUSIVE ORed against the ONE in core $C_{103}$ which results in ZERO's in cores $C_{102}$, $C_{104}$, and $C_{122}$. At time $T_{10}$ the ZERO's in cores $C_{102}$ and $C_{104}$ are read out by the next $n$ pulse and appear on output line $X_{104}$ as a ZERO corresponding to the $P_2$ bit position.

At time $T_{10}$, the $P_3$ bit which is a ZERO (absence of a pulse) arrives at core $C_{101}$ causing core $C_{101}$ to remain in the ZERO state into which it was set when the ONE it contained was read out at time $T_9$. The sign ping-pong applies a ONE to core $C_{103}$ at time $T_{10}$ setting that core into the ONE state. When the next $(n+1)$ pulse occurs at time $T_{11}$ the ZERO in core $C_{101}$ is EXCLUSIVE ORed against the ONE in core $C_{103}$ which results in a ONE being set into cores $C_{104}$ and $C_{122}$ and a ZERO in core $C_{102}$. At time $T_{12}$ the next $n$ pulse will read out cores $C_{102}$ and $C_{104}$ producing a ONE on the output line $X_{104}$ corresponding to the $P_3$ bit position. The $n$ pulse, occurring at time $T_{12}$, will also transfer the ONE in core $C_{122}$ into core $C_{103}$ which coincides with the pulse arriving from the ping-pong which also sets core $C_{103}$ into the ONE state. Due to the action of the ping-pong, a ONE will always be set into core $C_{103}$ starting at time $T_8$.

Also at time $T_{12}$, the $P_4$ bit which is a ONE arrives at core $C_{101}$ setting that core into the ONE state. At time $T_{13}$ the ONE in core $C_{101}$ will be EXCLUSIVE ORed with the ONE in core $C_{103}$ resulting in ZERO's in cores $C_{102}$, $C_{104}$, and $C_{122}$ which at time $T_{14}$ will appear on the output line $X_{104}$ as a ZERO corresponding to the $P_4$ bit.

At time $T_{14}$, the $P_5$ bit, which is a ZERO, is applied to core $C_{101}$ keeping that core in the ZERO state. At time $T_{15}$, the ZERO in core $C_{101}$ will be EXCLUSIVE ORed against the ONE that was set into core $C_{103}$ at time $T_{14}$ by a pulse from the ping-pong 27 circuit. The result of the EXCLUSIVE ORing is to set a ONE in cores $C_{104}$ and $C_{122}$ and a ZERO in core $C_{102}$ which the next $(n+1)$ pulse, occurring at time $T_{16}$, will read out and which will appear on line $X_{104}$ as a ONE corresponding to the $P_5$ bit position. Also at time $T_{16}$, the ONE in core $C_{122}$ is transferred to core $C_{103}$ together with the pulse from the ping-pong circuit to set that core into the ONE state.

At time $T_{16}$, the $P_6$ bit which is a ONE also arrives at core $C_{101}$ and sets that core into the ONE state. At time $T_{17}$, the ONE in core $C_{101}$ will be EXCLUSIVE ORed against the ONE in core $C_{103}$ which results in ZERO's being placed in cores $C_{102}$, $C_{104}$, and $C_{122}$. At time $T_{18}$, the ZERO's in cores $C_{102}$ and $C_{104}$ are transferred by the next $(n+1)$ pulse to the output line $X_{104}$ where they appear as a ZERO corresponding to the $P_6$ bit position.

The $P_6$ bit, which is the most significant bit of the number, is the last bit of the number to arrive from the memory 28. Thereafter, there will be no more bits arriving from the memory 28 until it supplies the next number to be operated upon by the adder. Since a ZERO is the absence of a pulse, the memory 28 after the $P_6$ bit has passed, will in effect be supplying a series of ZERO's to core $C_{101}$. However, the ping-pong will remain running which will keep core $C_{103}$ in the ONE state. The successive EXCLUSIVE ORing of a ZERO in core $C_{101}$ and a ONE in core $C_{103}$ will produce a series of ONE pulses on the output line $X_{104}$ after the passage of the $P_6$ bit as is shown in FIG. 3.

The $P_0$ sign position bit occurs on line $X_{104}$ as a ONE and occurs at time $T_6$, i.e., is displaced two pulse times. The number arrived from the memory 28 as:

| $P_0$ | $P_1$ | $P_2$ | $P_3$ | $P_4$ | $P_5$ | $P_6$ |
|---|---|---|---|---|---|---|
| 0 | 1 | 1 | 0 | 1 | 0 | 1 |

and appears on line $X_{104}$ displaced two pulse times as:

| $P_0$ | $P_1$ | $P_2$ | $P_3$ | $P_4$ | $P_5$ | $P_6$ |
|---|---|---|---|---|---|---|
| 1 | 0 | 0 | 1 | 0 | 1 | 0 |

which is the ONE's complement of the input number. That is, the output of the first EXCLUSIVE OR circuit 21 is the ONE's complement of the input number when the sign of the input number is positive ($P_0$ is a ZERO).

At time $T_4$, when the STA pulse was applied to cores $C_{101}$, $C_{103}$ and $C_{117}$, the STA pulse was also applied to core $C_{115}$ by way of line $X_{115}$ and set that core into the ONE state. The core $C_{115}$ together with cores $C_{109}$, $C_{110}$, $C_{116}$ and $C_{124}$ comprise the third EXCLUSIVE OR circuit 24. At time $T_5$, the ONE in core $C_{115}$ was EXCLUSIVE ORed with a ZERO in cores $C_{105}$ and $C_{109}$. The core $C_{109}$ will always contain a ZERO for the case under consideration because there is no input from the accumulator 29. The core $C_{105}$ will always contain a ZERO until the arrival of the $P_0$ bit from the first EXCLUSIVE OR circuit 21 which, as shown above, occurs at time $T_6$. Therefore, the result of the EXCLUSIVE ORing will be to transfer a ONE to cores $C_{116}$ and $C_{124}$ and a ZERO to core $C_{110}$. At time $T_6$, the next $n$ pulse will transfer the ONE in core $C_{116}$ to line $X_{110}$ which is the output of the adder and it will appear on the output terminal 32 as a ONE. This ONE appearing on the output line $X_{110}$ at time $T_6$ corresponds to the $P_{-1}$ bit position as is shown by FIG. 3. At time $T_4$, when the number is just starting to arrive from the memory 28, all of the cores contain a ZERO and the $n$ transfer pulse applied to cores $C_{110}$ and $C_{116}$ at time $T_4$ will produce a ZERO on the output line $X_{110}$ at time $T_4$, as shown in FIG. 3, which corresponds to the $P_{-2}$ bit position.

At time $T_6$, when the ONE in core $C_{116}$ is being transferred to the output line $X_{110}$, the ONE in core $C_{124}$ is transferred by way of lead 35 to core $C_{115}$ and sets that core into the ONE state. The core $C_{124}$ and lead 35 comprise a feedback circuit that operates in the same manner as the feedback arrangement discussed above in relation to the first EXCLUSIVE OR circuit 21.

Also at time $T_6$, the $P_0$ bit which, as shown above, is a ONE arrives on line $X_{104}$ from the first EXCLUSIVE OR circuit 21 and is set into the cores $C_{105}$ and $C_{123}$. The core $C_{105}$ together with cores $C_{109}$, $C_{104}$ and $C_{108}$ comprise the second EXCLUSIVE OR circuit 23. Since there is no input to the second EXCLUSIVE OR circuit from the accumulator 29, the cores $C_{107}$, $C_{108}$ and $C_{109}$ can be ignored and the information arriving from the first EXCLUSIVE OR circuit 21 will pass through core $C_{105}$ unchanged. The core $C_{123}$ together with the core $C_{106}$ comprise the delay means 22 shown in FIG. 1.

The next $(n+1)$ pulse at time $T_7$ will read out cores $C_{105}$, $C_{123}$ and $C_{115}$. The ONE in core $C_{123}$ will be transferred to core $C_{106}$ and the ONE in core $C_{105}$ will be EXCLUSIVE ORed with the ONE in core $C_{115}$ which will result in a ZERO set in cores $C_{110}$, $C_{116}$ and $C_{124}$. The next $n$ pulse at time $T_{12}$ will transfer the ZERO in cores $C_{110}$ and $C_{116}$ to the output line $X_{110}$ where it will appear as a ZERO corresponding to the $P_0$ bit position. Because core $C_{124}$ is in the ZERO state at time $T_8$, it cannot set the core $C_{115}$ into the ONE state, however, at time $T_8$ the ONE in core $C_{106}$ is transferred to core $C_{115}$ and sets that core into the ONE state. Also at time $T_8$, the $P_1$ bit, which is a ZERO, arrives from the first EXCLUSIVE OR circuit 21 on line $X_{104}$ and is applied to cores $C_{105}$ and $C_{123}$ causing these cores to remain in the ZERO state.

From the above, it is seen that the cores $C_{123}$ and $C_{106}$ produce a two pulse delay so that every bit placed into core $C_{105}$ from line $X_{104}$ is delayed two pulse times by the cores $C_{123}$ and $C_{106}$ and is set into core $C_{115}$ at the same time the next occurring bit is set into core $C_{105}$. That is, when a bit position is being transferred from the first EXCLUSIVE OR circuit 21 into the core $C_{105}$, the last previously occurring bit position is being transferred from core $C_{106}$ to core $C_{115}$. This does not mean that every bit placed into core $C_{105}$ is EXCLUSIVE ORed against the previous bit which is set into core $C_{115}$ from core $C_{106}$, for the previous bit may be a ZERO set in core $C_{106}$ at the same time that a ONE is set in core $C_{124}$. The next $n$ pulse would tend to transfer both the ZERO in core $C_{106}$ and the ONE in core $C_{124}$ into the core $C_{115}$, which would result in the ONE being set in core $C_{115}$ and not the ZERO which was the previously bit stored in core $C_{106}$.

At time $T_9$, the ZERO in core $C_{105}$ is EXCLUSIVE ORed against the ONE in core $C_{115}$ which results in a ONE set in cores $C_{116}$ and $C_{124}$ and a ZERO set in core $C_{110}$. Since a ZERO was the set of core $C_{123}$ at time $T_8$, the set of core $C_{106}$ remains a ZERO at time $T_9$. The next $n$ pulse occurring at time $T_{10}$ will transfer the ONE in core $C_{116}$ onto the output line $X_{110}$ where it will appear as a ONE corresponding to the $P_1$ bit position. Also, at time $T_{10}$, the ONE in core $C_{124}$ is transferred to core $C_{115}$ and the $P_2$ bit which is a ZERO is placed into core $C_{105}$ and core $C_{123}$. Since core $C_{106}$ contained a ZERO and core $C_{124}$ contained a ONE at time $T_{10}$, the ZERO in core $C_{106}$ did not set the core $C_{115}$ in the ZERO state.

From the above it is clear that a ONE is always set into core $C_{115}$ from either core $C_{106}$ or core $C_{124}$ as is shown in FIG. 3. Therefore, the bits arriving from the first EXCLUSIVE OR circuit 21 to the core $C_{105}$ are always EXCLUSIVE ORed against a ONE bit in the core $C_{115}$. This results in the output seen on line $X_{110}$ being the ONE's complement of the input to core $C_{105}$ as shown in FIG. 3 and disclosed in detail below. Since the number arriving from the memory 28 has already been ONE's complemented by the first EXCLUSIVE OR circuit 21, the second ONE's complementation by the third EXCLUSIVE OR circuit 24 will result in the original number as it arrived from the memory appearing on the output line $X_{110}$ as is shown by FIG. 3.

At time $T_{11}$ the next $(n+1)$ pulse will EXCLUSIVE OR the ZERO in core $C_{105}$ against the ONE in core $C_{115}$ thereby setting a ONE in cores $C_{116}$ and $C_{124}$. Also, at time $T_{11}$, the ONE in core $C_{116}$ is seen on the output line $X_{110}$ as a ONE corresponding to the $P_2$ bit position, and the ONE in core $C_{124}$ is transferred to the core $C_{115}$ at the same time that the $P_3$ bit which is a ONE is set into cores $C_{105}$ and $C_{123}$.

At time $T_{13}$, the ONE in core $C_{105}$ is EXCLUSIVE ORed with the ONE in core $C_{115}$ which results in a ZERO set in cores $C_{110}$, $C_{116}$ and $C_{124}$. Also at time $T_{13}$, the ONE set in core $C_{123}$ is transferred to core $C_{106}$. At time $T_{14}$, the ZERO in cores $C_{110}$ and $C_{116}$ is transferred to the output line $X_{110}$ where it appears as a ZERO corresponding to the $P_3$ bit position. Also, at time $T_{14}$, the ONE in core $C_{106}$ is read out and sets core $C_{115}$ in the ONE state at the same time that the $P_4$ bit, which is a ZERO, is set into cores $C_{105}$ and $C_{123}$.

At time $T_{15}$, the ZERO in core $C_{105}$ is EXCLUSIVE ORed against the ONE in core $C_{115}$ which results in a ONE being set into cores $C_{116}$ and $C_{124}$ and a ZERO in core $C_{110}$. Since the core $C_{123}$ was in a ZERO set at time $T_{15}$, the core $C_{106}$ remains in a ZERO set. At time $T_{16}$, the ONE in core $C_{116}$ is transferred to the output line $X_{110}$ and appears there as a ONE corresponding to the $P_4$ bit position. Also, at time $T_{16}$, the ONE in core $C_{124}$ is transferred to core $C_{115}$ at the same time that the $P_5$ bit position which is a ONE is set into cores $C_{105}$ and $C_{123}$.

At time $T_{17}$, the ONE in core $C_{105}$ is EXCLUSIVE ORed against the ONE in core $C_{115}$ resulting in a ZERO set in cores $C_{110}$, $C_{116}$ and $C_{124}$. Also, at time $T_{17}$, the ONE set in core $C_{123}$ is transferred to core $C_{106}$. At time $T_{18}$, the ZERO's in cores $C_{110}$ and $C_{116}$ are transferred to the output line $X_{110}$ where they appear as a ZERO corresponding to the $P_5$ position. Also, at time $T_{18}$, the ONE set of core $C_{106}$ is transferred to core $C_{115}$ at the same time that the $P_6$ bit which is a ONE is set into cores $C_{105}$ and $C_{123}$.

At this point it should be noted that the $P_6$ bit corresponds to the most significant bit from the memory 28 and, as shown above, is the last bit of the number to arrive from the memory 28. Also, as discussed above, the $P_0$ bit position of the number arriving from the memory 28 is the sign position bit that indicates the sign of the number. However, the $P_0$ bit position present in the output of the adder on line $X_{110}$ is not used as the sign position bit. The adder will generate a new sign position bit that will occur in the output number immediately after the occurrence of the most significant bit. Therefore, for the present example, the sign position bit will occur in the $P_7$ bit immediately after the occurrence of the most significant bit which is in the $P_6$ bit position. As shown above, the $P_0$ bit position in the output was a ZERO which was the sign of the incoming number. However, as will be shown below, when a single negative number is passed through the adder circuit, the $P_0$ bit position in the output number is also a ZERO.

At time $T_{19}$, the ONE in core $C_{105}$ will be EXCLUSIVE ORed with the ONE in core $C_{115}$ resulting in a ZERO set in cores $C_{110}$, $C_{116}$ and $C_{124}$. Also, at time $T_{19}$, the ONE in core $C_{123}$ will be transferred into core $C_{106}$. At time $T_{20}$, the ZERO in cores $C_{110}$ and $C_{116}$ will be transferred to the output line $X_{110}$ and will appear there as a ZERO corresponding to the $P_6$ bit position. Also, at time $T_{20}$, the ONE in core $C_{106}$ is transferred to core $C_{115}$ at the same time that a ONE is set into cores $C_{105}$ and $C_{123}$ due to the ping-pong circuit 27 being on.

As explained above, the new sign position bit is now being generated by the adder. At time $T_{21}$, the ONE in core $C_{105}$ is EXCLUSIVE ORed against the ONE in core $C_{115}$ and results in a ZERO set in cores $C_{110}$, $C_{116}$ and $C_{124}$. Also, at time $T_{21}$, the ONE in core $C_{123}$ is transferred to core $C_{106}$. At time $T_{22}$, the ZERO in cores $C_{110}$ and $C_{116}$ will be transferred to the output line $X_{110}$ and will appear there as a ZERO corresponding to the new sign position bit $P_7$ indicating the number is positive. Also, at time $T_{22}$, the ONE in core $C_{106}$ is transferred into core $C_{115}$ at the same time that a ONE is set into cores $C_{105}$ and $C_{123}$ due to the ping-pong 27 being on.

It is clear that the adder will continue to give ZERO's in the output positions such as $P_8$, $P_9$, $P_{10}$, etc., until the ping-pong is turned off because as long as the ping-pong is running, a ONE is always placed into core $C_{105}$ and a ONE will always be set into core $C_{115}$ from the core $C_{106}$.

The above shows that the adder will pass a positive binary number from the memory 28 unchanged except that the sign position bit is transferred from the $P_0$ bit position to the next $P_n$ bit position immediately following the bit position containing the most significant bit. That is, the number entered the adder as:

| $P_0$ | $P_1$ | $P_2$ | $P_3$ | $P_4$ | $P_5$ | $P_6$ |
|---|---|---|---|---|---|---|
| + | .1 | 1 | 0 | 1 | 0 | 1 |

and left the adder in the form:

| $P_7$ | $P_1$ | $P_2$ | $P_3$ | $P_4$ | $P_5$ | $P_6$ |
|---|---|---|---|---|---|---|
| + | .1 | 1 | 0 | 1 | 0 | 1 |

It is obvious that the bit positions that occur on the output line $X_{110}$ prior to the $P_1$ bit position (such as bits $P_0$, $P_{-1}$, and $P_{-2}$) and subsequent to the $P_7$ bit position (such as bits $P_8$, $P_9$, $P_{10}$, etc.) are surplusage and are to be disregarded. These bits are disregarded by the unit which receives the output of the adder. This may be accomplished in many ways such as the use of timed gates on the output of the adder which are well known in the art. Such arrangements do not constitute any part of the present invention and are not described in detail herein as such arragements are well known in the art.

After the binary number from the memory 28 has passed through the adder unit, it is stored in a suitable storage unit such as the accumulator 29.

Consider now the case where a single negative number arrives from the memory 28 to be passed through the adder. FIG. 4 shows the following number:

| $P_0$ | $P_6$ | $P_5$ | $P_4$ | $P_3$ | $P_2$ | $P_1$ |
|---|---|---|---|---|---|---|
| − | .1 | 0 | 1 | 0 | 1 | 1 |

which arrives from the memory 28 to be passed through the adder unit. Since the number is negative, the sign position $P_0$ is a ONE. As discussed above, the $P_1$ bit contains the least significant bit of the incoming number and occurs at time $T_6$, and the most significant bit of the incoming number is contained in the $P_6$ bit position which occurs at time $T_{16}$.

As discussed previously, when the number arriving from the memory 28 is negative, i.e., the $P_0$ bit contains a ONE, the sign ping-pong will not be activated and a series of pulses will not be applied to the core $C_{103}$ by way of line $X_{103}$ starting at time $T_8$.

Referring now to FIGS. 2 and 4, at time $T_4$, the $P_0$ bit which is a ONE is applied to core $C_{101}$ by way of line $X_{101}$ and tends to set that core into the ONE set. However, the STA pulse also occurs at time $T_4$ and is applied to core $C_{101}$ and tends to set that core in the ZERO state. Since the $P_0$ pulse and the STA pulse tries to set core $C_{101}$ into opposite states of remanence, the effect of each pulse will cancel out the other and core $C_{101}$ will remain in the ZERO state. The STA pulse is also applied by way of line $X_{102}$ to the core $C_{103}$ and sets that core into the ONE state. When the next $(n+1)$ pulse occurs at time $T_5$, the ZERO in core $C_{101}$ will be EXCLUSIVE OR'd against the ONE in core $C_{103}$ which will result in a ONE being set into cores $C_{104}$ and $C_{122}$, and ZERO in core $C_{102}$. At time $T_6$, the ONE in core $C_{104}$ is transferred to the output line $X_{104}$ and appears there as a ONE corresponding to the $P_0$ bit position. Also, at time $T_6$, the ONE in core $C_{122}$ is transferred to the core $C_{103}$ by way of line 34 at the same time that the $P_1$ bit which a ONE is set into the core $C_{101}$. As shown above, the STA pulse only occurs once, at time $T_4$, for each number supplied by the memory 28.

At time $T_7$, the ONE in core $C_{101}$ will be EXCLUSIVE OR'd against the ONE in core $C_{103}$ which results in a ZERO in cores $C_{102}$, $C_{104}$ and $C_{122}$. At time $T_8$, the ZERO in cores $C_{102}$ and $C_{104}$ will be transferred to the line $X_{104}$ and will appear there as a ZERO corresponding to the $P_1$ bit position. Also at time $T_8$, the $P_2$ bit, which is a ONE, is set into core $C_{101}$. Since there was a ZERO in the core $C_{122}$ at time $T_8$, a ONE was not transferred into core $C_{103}$. This differs from the case described above where a single positive number passes through the adder unit in that when the number was positive there was always a ONE in the core $C_{103}$ due to the feedback to core $C_{103}$ provided by the core $C_{122}$ and by the pulses supplied by the ping-pong 27.

At time $T_9$ the ONE in core $C_{101}$ is EXCLUSIVE OR'd against the ZERO in core $C_{103}$ which results in a ONE being set in core $C_{102}$ and a ZERO in cores $C_{104}$ and $C_{122}$. At time $T_{10}$, the ONE in core $C_{102}$ is transferred to the line $X_{104}$ and appears there as a ONE corresponding to the $P_2$ bit position. Also, at time $T_{10}$, the $P_3$ bit position which is a ZERO is set into core $C_{101}$, and again, a ONE is not fed back into core $C_{103}$ at time $T_{10}$ because there was a ZERO set in core $C_{122}$.

At time $T_{11}$, the ZERO in the core $C_{101}$ will be EXCLUSIVE OR'd against the ZERO in core $C_{103}$ which results in a ZERO set in cores $C_{102}$, $C_{104}$ and $C_{122}$. At time $T_{12}$, the ZERO in cores $C_{102}$ and $C_{104}$ will be transferred to the line $X_{104}$ and will appear there as a ZERO corresponding to the $P_3$ bit position. Also, at time $T_{12}$, the $P_4$ bit which is a ONE will set core $C_{101}$ in the ONE state. A ONE is not present in core $C_{103}$ because a ONE was not present in the core $C_{122}$ at time $T_{12}$. At time $T_{13}$, the ONE in core $C_{101}$ will be EXCLUSIVE OR'd against the ZERO in core $C_{103}$ which, as explained previously, will result in a ONE in line $X_{104}$ at time $T_{14}$. It is apparent now that there can be no ONE set in core $C_{103}$. This is due to the fact that a ONE is placed into core $C_{122}$ and subsequently fed back into core $C_{103}$ when and only when a ONE is set in core $C_{103}$ and a ZERO is set in core $C_{101}$. Since all the remaining incoming bits are placed into core $C_{101}$ by way of line $X_{101}$ from the memory 28, this condition will never occur.

Therefore, since what is applied to core $C_{101}$ will be EXCLUSIVE OR with a ZERO in core $C_{103}$, the set of core $C_{101}$ will appear unchanged two pulse times later on line $X_{104}$, that is, the $P_5$ bit which is a ZERO and which is set into core $C_{101}$ at time $T_{14}$ will appear on line $X_{104}$ as a ZERO corresponding to the $P_5$ bit position at time $T_{16}$, and the $P_6$ bit which occurs at time $T_{16}$ and is a ONE will set the core $C_{101}$ into the ONE state and will appear on line $X_{104}$ and time $T_{18}$ as a ONE corresponding to the $P_6$ bit position.

It will be noted that the $P_0$ sign position bit appearing on line $X_{104}$ at time $T_6$ is a ONE. It was also a ONE when the number arriving from the memory 28 was positive. Therefore, the $P_0$ bit appearing on line $X_{104}$ at time $T_6$ is always a ONE regardless of whether the incoming number from the memory 28 is positive or negative. Note also that the incoming $P_1$ bit which occurred at time $T_6$ is seen as a ZERO on line $X_{104}$ at time $T_8$ and that otherwise the incoming number as it appears on line $X_{104}$ was unchanged by the first EXCLUSIVE OR circuit 21, that is, the number arrived from the memory 28 as:

| $P_1$ | $P_2$ | $P_3$ | $P_4$ | $P_5$ | $P_6$ |
|---|---|---|---|---|---|
| .1 | 1 | 0 | 1 | 0 | 1 |

and appeared on line $X_{104}$ as:

| $P_1$ | $P_2$ | $P_3$ | $P_4$ | $P_5$ | $P_6$ |
|---|---|---|---|---|---|
| .0 | 1 | 0 | 1 | 0 | 1 |

that is, the first least significant ONE bit was ONE's complemented and the remaining bits of the number passed through the first EXCLUSIVE OR circuit 21 unchanged. Had there been any least significant ZERO bits prior to the first significant ONE bit, they would also have been ONE's complemented.

At time $T_4$, when the $P_0$ bit was being set into the core $C_{101}$, the STA pulse was also applied by way of line $X_{115}$ to core $C_{115}$ and that core into the ONE state. Prior to time $T_4$, as discussed previously in connection with the positive number from the memory 28, all of the cores are set into the ZERO state prior to the arrival of the $P_0$ sign position bit from the memory 28. Therefore, at time $T_5$, the ONE in core $C_{115}$ is EXCLUSIVE ORed against the ZERO in cores $C_{109}$ and $C_{105}$ which results in a ONE being set into cores $C_{116}$ and $C_{124}$ and a ZERO in core $C_{110}$. Since there is no input from the accumulator 29, the cores $C_{107}$, $C_{108}$ and $C_{109}$ can be ignored and the information entering core $C_{105}$ from line $X_{104}$ will pass through core $C_{105}$ unchanged. At time $T_5$, the ONE in core $C_{116}$ will be transferred to the output line $X_{110}$ and will appear there as a ONE corresponding to the $P_{-1}$ bit position. Also, at time $T_6$, the ONE in core $C_{124}$ will be transferred to core $C_{115}$ at the same time that the $P_0$ bit, which is a ONE, arrives on line $X_{104}$ and sets a ONE in cores $C_{105}$ and $C_{123}$.

At time $T_7$ the ONE in core $C_{105}$ will be EXCLUSIVE ORed with the ONE in the core $C_{115}$ which results in a ZERO set in cores $C_{110}$ and $C_{116}$. Also, at time $T_7$, the ONE in core $C_{123}$ is transferred to core $C_{106}$. At time $T_8$, the ZERO set of cores $C_{110}$ and $C_{116}$ is transferred to the output line $X_{110}$ and appears there as a ZERO corresponding to the $P_0$ bit position. Also, at time $T_8$, the ONE in core $C_{106}$ is transferred to core $C_{115}$. Since there was a ZERO in core $C_{124}$ at time $T_8$, core $C_{124}$ cannot set a ONE into core $C_{115}$. As was shown above, in the case of a positive word, a ONE will always be present in core $_{115}$ due to the feedback by core $C_{124}$ and to the delay means provided by cores $C_{106}$ and $C_{123}$. Therefore, the bits being placed into core $C_{105}$ by way of line $X_{104}$ will always be EXCLUSIVE ORed against a ONE in core $C_{115}$ which will result in the complement of the set of core $C_{105}$ appearing on output line $X_{110}$ two pulse times times later, that is, the $P_0$ bit which is a ZERO and is set into core $C_{105}$ at time $T_8$ will appear on output line $X_{110}$ as a ONE pulse corresponding to the $P_1$ bit at time $T_{10}$, the $P_2$ bit, which is a ONE, and is set into core $C_{105}$ at time $T_{10}$ will appear on line $X_{104}$ at time $T_{12}$ as a ZERO corresponding to the $P_2$ bit, the $P_3$ bit which is a ZERO and is set into core $C_{105}$ at time $T_{12}$ will appear in line $X_{110}$ at time $T_{14}$ as a ONE corresponding to the $P_3$ bit, the $P_4$ bit which is a ONE and is set into core $C_{105}$ at time $T_{14}$ will appear on line $X_{104}$ at time $T_{16}$ as a ZERO corresponding to the $P_5$ bit, the $P_5$ bit which is a ZERO and is set into core $C_{105}$ at time $T_{16}$ will appear on line $X_{104}$ at time $T_{18}$ as a ONE corresponding to the $P_5$ bit, and the $P_6$ bit which is the most significant bit of the incoming number and which, in this case is a ONE and is set in core $C_{105}$ at time $T_{18}$, will appear on line $X_{110}$ at time $T_{20}$ as a ZERO corresponding to the $P_6$ position, as is shown in FIG. 4.

As was discussed earlier, the $P_0$ bit appearing on the output line $X_{110}$ no longer designates the sign of the number. The $P_0$ bit which occurred on line $X_{110}$ at time $T_8$ is a ZERO which indicates a positive number, whereas, the number passing through the adder is a negative number. The sign position bit will be generated by the adder in the next bit position following the most significant bit which, in this case, is bit $P_6$ which occurred on the output line $X_{110}$ at time $T_{20}$. Therefore, the sign position bit $P_7$ will occur on line $X_{110}$ at time $T_{22}$ and will be a ZERO to indicate that the number passed through the adder from the memory 28 is negative.

Referring now to FIG. 4, it is shown that at time $T_{19}$ there was a ONE in core $C_{106}$ that was transferred into core $C_{115}$ at time $T_{20}$, a ONE is not set into core $C_{105}$ because the sign ping-pong 27 is not on and all of the bits of the incoming number have already passed through the first EXCLUSIVE OR circuit 21. Therefore, at time $T_{21}$, the ONE in core $C_{115}$ is EXCLUSIVE ORed with a ZERO in core $C_{105}$ which results in a ONE being set into core $C_{116}$ and core $C_{124}$. At time $T_{22}$, the ONE in core $C_{116}$ is transferred to the output line $X_{110}$ and appears there as a ONE corresponding to the new sign position bit $P_7$ which indicates that the number is negative. The adder has, therefore, generated a new sign position bit indicating the sign of the number that is seen on the output line $X_{110}$ at time $T_{22}$. This is accomplished by there being always a ONE in core $C_{115}$ and a ZERO in core $C_{105}$ due to the ping-pong not being on at time $T_{20}$.

The number arrived from the memory 28 in the form:

| $P_0$ | $P_1$ | $P_2$ | $P_3$ | $P_4$ | $P_5$ | $P_6$ |
|---|---|---|---|---|---|---|
| − | .1 | 1 | 0 | 1 | 0 | 1 |

and appears on line $X_{110}$ as:

| $P_7$ | $P_1$ | $P_2$ | $P_3$ | $P_4$ | $P_5$ | $P_6$ |
|---|---|---|---|---|---|---|
| − | .1 | 0 | 1 | 0 | 1 | 0 |

The answer number seen on line $X_{110}$ is the TWO's complement of the number that arrived into the adder from the memory 28. As will be shown below, when the adder performs addition or subtraction and the result is negative, the answer number will appear on line $X_{110}$ in the TWO's complement form.

As discussed previously, the excess bits that occur prior to the $P_1$ position bit, and the excess bits that occur subsequent to the $P_7$ bit, are disregarded. The bits comprising the output, that is, bits $P_1$ through bits $P_7$, are stored in a suitable storage means such as the accumulator 29.

*Addition of two positive numbers*

Consider now the case where the adder is to add two binary numbers. The first number arrives from the memory unit 28 and the second number arrives from the accumulator 29. The number arriving from the memory 28 will contain a $P_0$ sign position bit which indicates its sign, that is, a ZERO if the number is positive and a ONE if it is negative. However, a number arriving from the accumulator 29 does not have a sign $P_0$ position bit, but rather its sign position bit occurs last, after the occurrence of the bit containing the most significant bit of the number. This was shown above when a single number passing through the adder had its sign position bit transferred from the $P_0$ bit to the bit position following the most significant bit. After a single number passes through the adder it is stored, until needed, in the accumulator 29.

Assume that the following numbers are to be added as is shown in FIGURE 5:

| | $P_1$ | $P_2$ | $P_3$ | $P_4$ | $P_5$ | |
|---|---|---|---|---|---|---|
| +. | 0 | 1 | 1 | 0 | 1 | from memory |
| +. | 1 | 1 | 0 | 0 | 0 | from accumulator |
| +. | 1 | 0 | 0 | 1 | 1 | answer on line $X_{110}$ |

The answer is obviously +.10011. It must be remembered that the $P_1$ bit position is the least significant bit and the that the $P_5$ bit position is the most significant bit of the number. The $P_6$ position bit of the number supplied by the accumulator 29 is the sign position bit and indicates that the number is positive.

Since the number arriving from the memory 28 is positive the sign ping-pong will be turned on and the number will be ONE's complemented by the first EXCLUSIVE OR circuit 21. Reference to FIG. 5 shows the output from the first EXCLUSIVE OR circuit appears on line $X_{104}$ beginning at time $T_6$. The input from the accumulator 29 is also indicated in FIG. 5. Reference to FIG. 5 shows that the number arriving from the accumulator 29 has no $P_0$ sign bit position and the first bit $P_1$ occurs on line $X_{108}$, which is the output of the core $C_{108}$, at time $T_8$. This is so because at time $T_4$ there is nothing arriving from the accumulator 29 because the accumulator 29 does not provide a $P_0$ sign position bit. The first bit of the number from the accumulator 29 is the $P_1$ bit and it occurs at time $T_6$ and is applied to core $C_{107}$ by way of line $X_{107}$. Core $C_{107}$ delays the word arriving from the accumulator 29 by one pulse time so that the bits of the number from the accumulator 29 entering the core $C_{108}$ will occur simultaneously in time with the bits of the word from the memory 28 being transferred into cores $C_{102}$ and $C_{104}$ of the first EXCLUSIVE OR circuit 21, that is, the $P_1$ position bit of the word arriving from the accumulator 29 will appear on line $X_{108}$ at time $T_8$ which corresponds to the time that the $P_1$ bit position of the number from the memory 28 occurs on line $X_{104}$. Reference to FIG. 5 will show the output from core $C_{108}$ that appears on line $X_{108}$ beginning at time $T_8$ and the output from the first EXCLUSIVE OR circuit 21 that appears on line $X_{104}$ beginning at time $T_6$.

Cores $C_{104}$, $C_{105}$, $C_{109}$ and $C_{108}$ comprise the second EXCLUSIVE OR circuit 23 shown in block diagram form in FIG. 1. The output from the first EXCLUSIVE OR circuit 21 appears on line $X_{104}$ and is EXCLUSIVE ORed with the output of core $C_{108}$ which appears on line $X_{108}$ which appears on line $X_{108}$. As is shown in FIG. 5, the ONE's complement of the number arriving from the memory 28 appears on line $X_{104}$ and is EXCLUSIVE ORed with the output of core $C_{108}$ which is the number arriving from the accumulator 29 and which appears on line $X_{108}$.

FIGS. 2 and 5 show that at time $T_4$, the STA pulse is applied by way of line $X_{115}$ to core $C_{115}$ and sets that core into the ONE state. At time $T_5$, the ONE in core $C_{115}$ is EXCLUSIVE ORed with the ZERO in core $C_{109}$ which results in a ONE being set into cores $C_{116}$ and $C_{124}$ and a ZERO set in core $C_{110}$. At time $T_6$, the ONE in core $C_{116}$ is transferred to the output line $X_{110}$ and appears there as a ONE corresponding to the $P_{-1}$ bit position. Also, at time $T_6$, the ONE in core $C_{124}$ is transferred to the core $C_{115}$ at the same time that the $P_0$ bit, which is a ONE, enters cores $C_{105}$ and $C_{123}$. The $P_0$ bit which was entered into cores $C_{105}$ and $C_{103}$ at time $T_6$ is the $P_0$ sign position bit of the number arriving into the adder from the memory 28 and, as has been shown previously, it is always a ONE when it arrives on line $X_{104}$ from first EXCLUSIVE OR circuit 21.

At time $T_7$, the ONE in core $C_{105}$ is EXCLUSIVE ORed against the ONE in core $C_{115}$ which results in a ZERO set in cores $C_{110}$, $C_{116}$ and $C_{124}$. Also at time $T_7$, the ONE in the core $C_{123}$ is transferred into core $C_{106}$. At time $T_8$, the ZERO in cores $C_{110}$ and $C_{116}$ will be transferred to the output line $X_{110}$ and will appear there as a ZERO corresponding to the $P_0$ bit position. Also, at time $T_8$, the ONE in core $C_{106}$ is transferred into core $C_{115}$.

Notice that at time $T_8$, the $P_1$ bit position of the number arriving from the memory 28 is appearing on line $X_{104}$ and also that the $P_1$ bit position of the word arriving from the accumulator 29 is arriving on line $X_{108}$. Since cores $C_{104}$, $C_{105}$, $C_{108}$ and $C_{109}$ comprise the now familiar EXCLUSIVE OR circuits, these bits arriving on these two lines will be EXCLUSIVE ORed against each other.

Reference to FIG. 5 shows that at time $T_8$, the $P_1$ bit position arriving on line $X_{104}$ is a ONE and will be EXCLUSIVE ORed against the $P_1$ bit position appearing on line $X_{108}$ which is also a ONE which will result in a ZERO set in the cores $C_{109}$, $C_{105}$ and $C_{123}$. At time $T_9$, the ONE in core $C_{115}$ will be EXCLUSIVE ORed against the ZERO appearing in cores $C_{109}$ and $C_{105}$ resulting in a ONE set in cores $C_{116}$ and $C_{124}$ and a ZERO in core $C_{110}$. At time $T_{10}$, the ONE in core $C_{116}$ will be transferred to the output line $X_{110}$ where it will appear as a ONE corresponding to the $P_1$ bit position. Also, at time $T_{10}$, the ONE in the core $C_{124}$ will be transferred into core $C_{115}$.

At time $T_{10}$, the $P_2$ bit position of the word arriving from the memory 28 appears on the line $X_{104}$ as a ZERO and is EXCLUSIVE ORed against the $P_2$ bit position of the number arriving from the accumulator 29, which appears on line $X_{108}$ as a ONE, resulting in a ONE set in core $C_{109}$ and a ZERO set in cores $C_{105}$ and $C_{123}$. At time $T_{11}$, the ONE in core $C_{109}$ is EXCLUSIVE ORed against the ONE in core $C_{115}$ resulting in a ZERO set in cores $C_{110}$, $C_{116}$, and $C_{124}$. At time $T_{12}$, the ZERO in cores $C_{110}$ and $C_{116}$ is transferred to the output line $X_{110}$ where a ZERO will appear corresponding to the $P_2$ bit position. Note that a ONE was not transferred into core $C_{115}$ from either core $C_{106}$ or $C_{124}$ at the time $T_{12}$. This is in contrast to the condition when a single number from the memory 28 passes through the adder in which case a ONE is always present in the core $C_{115}$.

At time $T_{12}$, the $P_3$ bit position of the word arriving from the memory appears on line $X_{104}$. It is a ZERO, and is EXCLUSIVE ORed with the corresponding $P_2$ bit position of the word arriving from the accumulator 29, which is a ZERO appearing on line $X_{108}$. The EXCLUSIVE ORing results in a ZERO in cores $C_{109}$, $C_{105}$ and $C_{123}$. At time $T_{13}$ the ZERO in cores $C_{109}$ and $C_{105}$ will be EXCLUSIVE ORed against the ZERO in core $C_{115}$ which will result in ZERO's in cores $C_{110}$, $C_{116}$ and $C_{124}$ and a ZERO on the output line $X_{110}$ at time $T_{14}$ corresponding to the $P_3$ bit position.

At time $T_{14}$, the $P_4$ bit seen on line $X_{104}$ is a ONE and is EXCLUSIVE ORed with the $P_4$ bit seen on line $X_{108}$ which is a ZERO resulting in a ONE set in cores $C_{105}$ and $C_{123}$. Since there was not a ONE in core $C_{106}$ or core $C_{124}$ at time $T_{13}$, there will not be a ONE set in core $C_{115}$ at time $T_{14}$. At time $T_{15}$, the ONE in core $C_{105}$ is EXCLUSIVE ORed with the ZERO in core $C_{115}$ resulting in a ONE in core $C_{110}$ and a ZERO set in cores $C_{116}$ and $C_{124}$. Also, at time $T_{15}$, the ONE in core $C_{123}$ will be transferred to the core $C_{106}$. At time $T_{16}$, the ONE in core $C_{101}$ will be transferred to the output line $X_{110}$ and will appear there as a ONE corresponding to the $P_4$ bit position. Also, at time $T_{16}$, the ONE in core $C_{106}$ will be transferred to core $C_{115}$.

At time $T_{16}$, the $P_5$ bit position seen on line $X_{104}$ is a ZERO and is EXCLUSIVE ORed with the $P_5$ bit position seen on line $X_{108}$ which is a ZERO which results in a ZERO set in cores $C_{123}$, $C_{105}$ and $C_{109}$. It should be noted that the $P_5$ bit position is the most significant bit position of the two binary numbers being added by the adder. As discussed above, the adder will generate a sign position bit that indicates the sign of the number on the output line $X_{110}$ in the next bit position following the most significant bit. In this case, since the most significant bit of the numbers occurs in the $P_5$ position, the $P_6$ bit occurring on the output line $X_{110}$ will contain the sign of the result of the addition performed by the adder. Since the result of the addition being performed by the adder is positive, the $P_6$ position appearing on line $X_{100}$ at time $T_{20}$ must be a ZERO. At time $T_{17}$, the ZERO in cores $C_{105}$ and $C_{109}$ will be EXCLUSIVE ORed with the ONE in core $C_{115}$ resulting in a ONE in cores $C_{116}$ and $C_{124}$ and a ZERO in core $C_{110}$. At time $T_{18}$, the ONE in core $C_{116}$ will be transferred to the output line $X_{110}$ and will appear there as a ONE corresponding to the $P_5$ bit position. Also, at time $T_{18}$, the ONE in core $C_{124}$ will be transferred to core $C_{115}$.

Now the adder must give a $P_6$ bit position that indicates that the result of the addition appearing on line $X_{110}$ is positive, that is, the adder must generate a $P_6$ ZERO bit. At time $T_{18}$, a ZERO appears on line $X_{108}$ corresponding to the $P_6$ bit position indicating the word arriving from the accumulator 29 was positive. Also, a ONE will appear on line $X_{104}$ at time $T_{18}$ because the ping-pong is running which is EXCLUSIVE ORed with the ZERO on line $X_{108}$. Therefore, at time $T_{18}$, a ONE appears in cores $C_{105}$ and $C_{123}$. At time $T_{19}$, the ONE in core $C_{105}$ is EXCLUSIVE ORed against the ONE appearing in core $C_{115}$ which results in a ZERO in cores $C_{110}$, $C_{116}$ and $C_{124}$. At time $T_{20}$, the ZERO in cores $C_{110}$ and $C_{116}$ is transferred to the output line $X_{110}$ and appears there as a ZERO corresponding to the new sign position bit $P_6$ and indicates that the result of the addition of the two numbers is positive. Also, at time $T_{20}$, the ONE in core $C_{123}$ is transferred to core $C_{106}$.

The above shows that the number arriving from the adder is:

| $P_6$ | $P_1$ | $P_2$ | $P_3$ | $P_4$ | $P_5$ |
|---|---|---|---|---|---|
| + | .1 | 0 | 0 | 1 | 1 |

which is the result of adding the two binary numbers given above. The surplus bits occurring prior to the $P_1$ bit and the surplus bits occurring subsequent to the $P_6$ bit will be disregarded as explained previously. Therefore, it has been shown that the adder can add two positive binary numbers and also give an output indicating the sign of the result of the addition.

*Addition of a negative and positive number*

Consider now the case when the number arriving from the memory 28 is negative and is −.10110 and the number arriving from the accumulator 29 is positive and is +.00011 as is shown in FIG. 6. The result is obviously −.10011. Since a negative number always leaves the adder in TWO's complement form, the answer from the adder will be the TWO's complement of −.00011 which is −.01101. The input numbers and the result will enter and leave the adder in the following form:

| | | | | | | | |
|---|---|---|---|---|---|---|---|
| $P_0$ | $P_1$ | $P_2$ | $P_3$ | $P_4$ | $P_5$ | | |
| 1 | 0 | 1 | 1 | 0 | 1 | | from memory 28 |
| | $P_1$ | $P_2$ | $P_3$ | $P_4$ | $P_5$ | $P_6$ | |
| | 1 | 1 | 0 | 0 | 0 | 0 | from accumulator 29 |
| | 1 | 0 | 1 | 1 | 0 | 1 | answer on line $X_{110}$ |

The $P_0$ bit of the number arriving from the memory 28 is the sign position bit and indicates the sign of the number. The $P_6$ bit is the sign position bit of the number arriving from the accumulator 29 and indicates that the number is positive. The $P_6$ bit is also the sign position bit of the answer and indicates that the answer is negative. The $P_1$ bit is the least significant and $P_5$ is the most significant bit of both of the numbers. Since the number arriving from the memory 28 is negative, the sign ping-pong 27 will not be activated. Also, because the number is negative, it will appear on line $X_{104}$, which is the output of the first EXCLUSIVE OR circuit 21, with the first least significant ONE and all lower order ZERO's complemented. That is, the number arriving from the memory 28 will appear on line $X_{104}$ as:

| $P_0$ | $P_1$ | $P_2$ | $P_3$ | $P_4$ | $P_5$ |
|---|---|---|---|---|---|
| 1 | 1 | 0 | 1 | 0 | 1 |

As explained above, the $P_0$ bit is always a ONE when it appears on line $X_{104}$.

Referring now to FIGS. 2 and 6, it is shown that at time $T_4$, the STA pulse set core $C_{115}$ into the ONE state. At time $T_5$, the ONE in core $C_{115}$ is EXCLUSIVE ORed with the ZERO's in cores $C_{105}$ and $C_{109}$ which results in a ONE in cores $C_{124}$ and $C_{116}$ is transferred to the output line $X_{110}$ where it appears as a ONE corresponding of the $P_{-1}$ bit position. Also, at time $T_6$, the ONE in core $C_{124}$ is transferred to core $C_{115}$ by way of line 35 at the same time that the $P_0$ bit of the number from the memory 28, which is a ONE, arrives on line $X_{104}$ and sets a ONE in cores $C_{105}$ and $C_{123}$.

At time $T_7$, the ONE in core $C_{115}$ is EXCLUSIVE ORed with the ONE in core $C_{105}$ which results in a ZERO set in cores $C_{110}$, $C_{116}$ and $C_{124}$. Also, at time $T_7$, the ONE in core $C_{123}$ is transferred to core $C_{106}$. At time $T_8$, the ZERO in cores $C_{106}$ and $C_{110}$ is transferred to the output line $X_{110}$ and appears there as a ZERO corresponding to the $P_0$ bit position. Also, at time $T_8$, the ONE in core $C_{106}$ is transferred into core $C_{115}$.

At time $T_8$, the first $P_1$ bit of the number arriving from the memory 28 appears on line $X_{104}$ after being passed through the first EXCLUSIVE OR circuit 21 and is EXCLUSIVE ORed with the first $P_1$ bit of the number arriving from the accumulator 29 which appears on line $X_{108}$. Core $C_{107}$ acts as a delay causing the bits of the number arriving from the accumulator 29 to appear on line $X_{108}$ at the same time as the corresponding bits of the number from the memory 28 appear on line $X_{104}$.

At time $T_8$, the $P_1$ bit on line $X_{104}$ is a ONE and is EXCLUSIVE ORed with the $P_1$ bit on line $X_{108}$ which is also a ONE resulting in a ZERO set in cores $C_{123}$, $C_{105}$ and $C_{109}$. At time $T_9$, the ONE in core $C_{115}$ is EXCLUSIVE ORed with the ZERO set of cores $C_{105}$ and $C_{109}$ resulting in a ONE set in cores $C_{116}$ and $C_{124}$. At time $T_{10}$, the ONE in core $C_{116}$ is transferred to the output line $X_{110}$ and appears there as a ONE corresponding to the $P_1$ bit position. Also, at time $T_{10}$, the ONE in core $C_{124}$ is set into core $C_{115}$.

At time $T_{10}$, the $P_2$ bit on line $X_{104}$ is a ZERO and is EXCLUSIVE ORed with the $P_2$ bit on line $X_{108}$ which is a ONE resulting in a ONE set in core $C_{109}$ and a ZERO set in cores $C_{123}$ and $C_{105}$. At time $T_{11}$, the ONE in core $C_{109}$ is EXCLUSIVE ORed with the ONE in core $C_{115}$ resulting in a ZERO set in cores $C_{110}$, $C_{116}$ and $C_{124}$. At time $T_{12}$, the ZERO set of cores $C_{110}$ and $C_{116}$ is transferred to the output line $X_{110}$ and appears there as a ZERO corresponding to the $P_2$ bit position. A ONE is not set into core $C_{115}$ at time $T_{12}$ because both cores $C_{124}$ and $C_{106}$ contained a ZERO.

At time $T_{12}$, the $P_3$ bit on line $X_{104}$ is a ONE and is EXCLUSIVE ORed against the $P_3$ bit on line $X_{108}$ which is a ZERO resulting in a ONE set in cores $C_{123}$ and $C_{105}$ and a ZERO set in core $C_{109}$. At time $T_{13}$, the ONE in core $C_{105}$ is EXCLUSIVE ORed against the ZERO in core $C_{115}$ resulting in a ONE set in core $C_{110}$ and a ZERO set in cores $C_{116}$ and $C_{124}$. Also, at time $T_{13}$, the ONE in core $C_{123}$ is transferred into core $C_{106}$. At time $T_{14}$, the ONE in core $C_{110}$ is transferred to the output line $X_{110}$ where it appears as a ONE corresponding to the $P_3$ bit position. Also, at time $T_{14}$, the ONE in core $C_{106}$ is transferred to core $C_{115}$.

At time $T_{14}$, the $P_4$ bit on line $X_{104}$ is a ZERO and is EXCLUSIVE ORed against the $P_4$ bit on line $X_{108}$ which is also a ZERO resulting in a ZERO set in cores $C_{123}$, $C_{105}$ and $C_{109}$. At time $T_{15}$, the ONE in core $C_{115}$ is EXCLUSIVE ORed against the ZERO in cores $C_{105}$ and $C_{109}$ resulting in a ONE set in cores $C_{116}$ and $C_{124}$ and a ZERO set in core $C_{110}$. At time $T_{16}$, the ONE in core $C_{116}$ is transferred to the output line $X_{110}$ where it appears as a ZERO corresponding to the $P_4$ bit position. Also, at time $T_{16}$, the one in core $C_{124}$ is transferred into core $C_{115}$.

At time $T_{16}$, the $P_5$ bit on line $X_{104}$ is a ONE and is EXCLUSIVE ORed against the $P_5$ bit on line $X_{108}$ which is a ZERO resulting in a ONE set in cores $C_{105}$ and $C_{123}$ and a ZERO set in core $C_{109}$. At time $T_{17}$, the ONE in core $C_{115}$ is EXCLUSIVE ORed against the ONE in core $C_{105}$ resulting in a ZERO set in cores $C_{110}$, $C_{116}$ and $C_{124}$. Also, at time $T_{17}$, the ONE set of core $C_{123}$ is transferred to core $C_{106}$. At time $T_{18}$, the ZERO set of cores $C_{110}$ and $C_{116}$ is transferred to the output line $X_{110}$ where it appears as a ZERO corresponding to the $P_5$ bit position. Also, at time $T_{18}$, the ONE in core $C_{106}$ is set into core $C_{115}$.

It will be noted that all of the bits of both numbers have now passed through the adder and now the adder must generate the sign bit for the answer number. At time $T_{18}$, the bit seen on line $X_{104}$ is a ZERO, because the sign ping-pong is not turned on by a negative number arriving from the memory 28, which is EXCLUSIVE ORed against the $P_6$ sign bit position on line $X_{108}$ which is a ZERO resulting in a ZERO set in cores $C_{105}$, $C_{123}$ and $C_{109}$. The $P_6$ bit on the number arriving from the accumulator 29 is the sign position bit of that number as explained previously and is a ZERO because the number is positive. At time $T_{19}$, the ONE in core $C_{115}$ is EXCLUSIVE ORed against the ZERO in cores $C_{105}$ and $C_{109}$ resulting in a ONE set in cores $C_{116}$ and $C_{123}$ and a ZERO set in core $C_{110}$. At time $T_{20}$, the ONE in core $C_{116}$ is transferred to the output line $X_{110}$ where it appears as a ONE corresponding to the sign position bit $P_6$. Reference to FIG. 6 will show that the answer appearing on line $X_{110}$ is the TWO's complement of the correct answer and that the adder has generated the correct sign of the resulting addition in the $P_6$ bit position. The answer comprises bits $P_1$ through $P_6$. As explained previously, all other bits appearing on the output line $X_{110}$ will be disregarded.

The operation described in conjunction with FIG. 2 show that core $C_{104}$ comprises a part of the first EXCLUSIVE OR circuit 21 and part of the second EXCLUSIVE OR circuit 23. Cores $C_{109}$ and $C_{105}$ comprise part of the second EXCLUSIVE OR circuit 23 and also a part of the third EXCLUSIVE OR circuit 24. This arrangement reduces the number of magnetic cores used in the adder circuit. Also, it is clear that the delay provided by cores $C_{123}$ and $C_{106}$ is essentially a carry operation. FIG. 2 also shows that the core $C_{118}$ is part of the inhibitor circuit 25 and part of the fourth EXCLUSIVE OR circuit 26.

*Subtraction*

Since the addition of a negative number to a positive number is subtraction, it is evident that the adder can perform subtraction. In order to perform subtraction, the adder must first determine the sign. That is, if the subtrahend is a negative number, the resulting subtraction becomes a straight addition and if the subtrahend is a positive number, the resulting subtraction is the addition of the complement of the subtrahend.

The sign is determined by the inhibitor circuit 25 and the fourth EXCLUSIVE OR circuit 26. Referring now to FIG. 2, at time $T_4$, the $P_0$ bit, of the word arriving from the memory 28, is placed into core $C_{120}$. The STA pulse also occurs at time $T_4$ at terminal 30 and sets core $C_{117}$ in the ONE state. If the operation to be performed is subtraction, an SUA pulse occurs on terminal 31 at time $T_4$ and will set core $C_{121}$ into the ONE state. At time $T_5$, the next $(n+1)$ pulse will advance all three cores: $C_{121}$, $C_{120}$ and $C_{117}$. However, if $P_0$ is a ONE, it will inhibit the ONE in core $C_{117}$ from being set into core $C_{118}$. If $P_0$ was a ZERO, the ONE in core $C_{117}$ will be set into core $C_{118}$ as was described previously. In either case, at time $T_6$, the next $n$ pulse advances the set of cores $C_{118}$ and $C_{112}$ into the fourth EXCLUSIVE OR circuit comprising cores $C_{112}$, $C_{113}$, $C_{118}$ and $C_{119}$. Thus, if the number is negative, i.e., $P_0$ is a ONE, then core $C_{113}$ is set into the ONE state. However, if the number is positive, i.e., $P_0$ is a ZERO, neither core $C_{113}$ or core $C_{119}$ will be set into the ONE state. At time $T_7$, the next $(n+1)$ pulse will read out cores $C_{113}$ and $C_{119}$ and activate the ping-pong if the word was negative. After the sign is determined, the adder goes on to perform addition as described above.

Cores $C_{121}$, $C_{112}$ and $C_{113}$ form the circuit used for subtraction by determining the sign of the incoming word and the operation to be performed as shown in the following table:

| Operation | SUA | STA | $P_0$ | Ping-Pong |
|---|---|---|---|---|
| Add | 0 | 1 | 0 | ON at $T_8$. |
| Add | 0 | 1 | 1 | OFF. |
| Subtract | 1 | 1 | 1 | ON at $T_8$. |
| Subtract | 1 | 1 | 0 | OFF. |

The table shows that whenever any two of these inputs (STA, SUA or $P_0$ are a ONE) the sign ping-pong is OFF, otherwise the sign ping-pong will be activated.

Since any mathematical operation may be defined in terms of addition and subtraction, it is clear that by proper programming, the adder may perform many mathematical operations.

*Rounding off*

The adder can also round off the resulting answer for certain operations. In any operation but addition and subtraction, the number of bits in the result may be more than the number of bits in either of the input numbers. For example, in multiplication the sum of the partial products may contain more bits than either the multiplier or multiplicand.

As discussed above, extra bits will be generated in the $P_0$, $P_{-1}$, ——— $P_{-n}$ bit positions. Of course these extra digits can be disregarded, but depending upon what the extra bits are, a carry may or may not occur into the $P_1$ or first significant bit position of the result which would be undesirable. In order to overcome this difficulty a rounding off pulse, hereinafter called an RDA pulse, is generated at time $T_4$ on terminal 33 as shown in FIG. 2 and applied by way of line $X_{105}$ to cores $C_{123}$, $C_{105}$ and $C_{109}$. It was shown previously, that the $P_1$ bit of the number arriving from the memory 28 or accumulator 29 will appear on line $X_{104}$ or line $X_{108}$ at time $T_8$. The extra bits $P_0$, $P_{-1}$, etc., occur prior to time $T_8$. Therefore, cores $C_{105}$ and $C_{123}$ may or may not have a ONE set at time $T_8$ when the $P_1$ bits arrive. At time $T_4$, the RDA pulse appearing on terminal 33 is applied to cores $C_{105}$, $C_{123}$ and $C_{109}$ by way of line $X_{105}$. The RDA pulse sets a ZERO into cores $C_{123}$ and $C_{105}$ and a ONE in core $C_{109}$. Also, at time $T_4$, the STA pulse sets core $C_{115}$ into the ONE state.

At time $T_5$, the ZERO in core $C_{123}$ is advanced to core $C_{106}$. At the same time, the ONE in core $C_{109}$ is EXCLUSIVE ORed against the ONE in core $C_{115}$ resulting in a ZERO set in cores $C_{110}$, $C_{116}$ and $C_{124}$. That is, neither core $C_{110}$ nor core $C_{116}$ is set with a ONE at time $T_5$. At time $T_6$, the ZERO set of cores $C_{110}$ and $C_{116}$ is transferred to the output line $X_{110}$ and appears there as a ZERO corresponding to the $P_{-1}$ bit position. Also, at time $T_6$, a ONE is not transferred into core $C_{115}$ because cores $C_{106}$ and $C_{124}$ contained ZERO's. Reference to FIGS. 3, 4, 5 and 6 show that the $P_{-2}$ bit position is always a ZERO.

Further, at time $T_6$, the $P_0$ bit arrives on line $X_{104}$ and, as shown above, is always a ONE and it will be the only determining bit for rounding off the result of an adder operation. Thus, the word has been rounded off, i.e., no ONE bits can occur in the output prior to the $P_0$ bit, and only the first bit on the least significant side of the $P_1$ bit is the determining factor in the round off.

*Clearing the adder*

For most operations performed by the adder, clearing of the adder is accomplished by the $n$ and $(n+1)$ pulses advancing any left over bits out of the adder circuits prior to the arrival of new incoming numbers. This is possible because of the serial input nature of the incoming bits. However, in some cases, it may be desirable to clear the adder quickly without waiting for the left over bits to be pulsed out of the adder. This can be accomplished by the CL pulse. Reference to FIG. 2 will show that each core contains a CL input winding that will set the core into the ZERO state. Whenever it is desirable to clear the adder quickly, the CL pulse is generated and applied to all of the cores simultaneously which sets each core into the ZERO state.

Also, once the ping-pong has been started, it is necessary that it be turned off prior to the beginning of the next operation to be performed by the adder circuit. It is obvious that the CL pulse will deactivate the ping-pong because the CL pulse will simultaneously set a ZERO into cores $C_{114}$ and $C_{125}$ which comprise the ping-pong circuit 27. However, when the CL pulse is not used to clear the adder, the STA pulse occurring for the next operation will deactivate the ping-pong 27.

Assume the adder performed an operation which activated the ping-pong circuit 27. The ping-pong 27 will continue running after the operation is completed. When the next operation to be performed by the adder is to begin at a time corresponding to $T_4$, the STA pulse is generated, and as is shown in FIG. 2, is applied to core $C_{125}$ of the ping-pong and sets the core into the ZERO state. The double arrowhead on the STA input line to core $C_{125}$ indicates that the existence of the STA pulse will hold the core $C_{125}$ to that state despite the presence of other input signals. Reference to FIG. 3 will show that if the ping-pong is running, the ONE in core $C_{114}$ will be transferred into core $C_{125}$ at all even numbered pulse times. Therefore, the ONE from core $C_{114}$ will appear as an input to core $C_{125}$ at the same time that the STA pulse is applied to core $C_{125}$. However, because of the nature of the STA input winding discussed above, the ONE from core $C_{114}$ will not set a ONE in core $C_{125}$ but the STA pulse will keep core $C_{125}$ in a ZERO set. Therefore, at the time equivalent to time $T_4$ when the next operation begins, a ZERO will be in cores $C_{114}$ and $C_{125}$ comprising the ping-pong 27 and the ping-pong 27 will be deactivated.

Note that at the time equivalent to time $T_4$, the ONE pulse from core $C_{114}$ is also applied by line $X_{103}$ to core $C_{103}$ and tends to set that core in the ONE state. This is not undesirable because the STA pulse which occurs at the same time is also applied to core $C_{103}$ and tends to set it into the ONE state. That is, it is necessary that a ONE be set into core $C_{103}$ at the time equivalent to time $T_4$ for every operation performed by the adder.

*Sign determination*

It was shown previously in the detailed description of functions performed by the adder, that the adder circuit generates a bit which indicates the sign of the number leaving the adder and that this sign bit occurred in the next bit that occurs subsequent to the most significant bit of the number leaving the adder. No one particular circuit in the adder determines the sign bit. Rather, it is a function of (a) whether the ping-pong 27 was turned on, (b) the sign of the number supplied by the accumulator 29, and (c) the internal condition of core $C_{115}$ at the time the sign position bit is generated. The rules for sign determination of the output of the adder are:

(1) When two positive numbers are added; at the same time that a ONE pulse is set into core $C_{105}$ due to the ping-pong 27 circuit being on a ONE pulse is set into core $C_{115}$ from either core $C_{106}$ or $C_{124}$. When the ONE in core $C_{115}$ is EXCLUSIVE ORed against the ONE in core $C_{105}$ it produces a ZERO in the sign position bit of the output.

(2) When two negative numbers are added; at the same time that the sign position ONE bit of the number from the accumulator 29 is placed into core $C_{109}$, a ONE pulse is not placed into core $C_{115}$ from either core $C_{124}$ or $C_{106}$. When the ONE in core $C_{109}$ is EXCLUSIVE ORed with the ZERO in core $C_{115}$, it produces a ONE in the sign position bit of the output.

(3) When two numbers are added, one positive and one negative, and the positive number is the greater and arrives from the memory 28; at the same time that a ZERO is placed into cores $C_{105}$ and $C_{109}$ due to the ping-pong 27 being on and a sign position ONE pulse arriving from the number supplied by the accumulator 29, a ONE pulse is not placed into core $C_{115}$ from either core $C_{124}$ or $C_{106}$. When the ZERO in cores $C_{105}$ and $C_{109}$ is EXCLUSIVE ORed with the ZERO in core $C_{115}$, it produces a ZERO in the sign position bit of the output.

(4) When two numbers are added, one positive and one negative, and the positive number is greater and arrives from the accumulator 29; at the same time that a ZERO is placed into cores $C_{105}$ and $C_{109}$ due to the ping-pong circuit 27 not being on and a ZERO in the sign position bit of the number supplied by the accumulator 29, a ONE pulse is not placed into core $C_{115}$ either from core $C_{106}$ or core $C_{124}$. When the ZERO in core $C_{105}$ and $C_{109}$ is EXCLUSIVE ORed against the ZERO in core $C_{115}$, it produces a ZERO in the sign position bit of the output.

(5) When two numbers are added, one positive and one negative, and the negative number is greater and arrives from either the memory 28 or accumulator 29; at the same time that a sign position ZERO is placed into cores $C_{105}$ and $C_{109}$ in accordance with Rules 3 and 4 above, a ONE is placed into core $C_{115}$ from either core $C_{106}$ or $C_{124}$. When the ZERO in cores $C_{105}$ and $C_{109}$ is EXCLUSIVE ORed with the ONE in core $C_{115}$, it produces a ONE in the sign position bit of the output.

The validity of Rules 1 and 5, respectively, has been shown previously by the detailed description of addition by the adder in connection with FIGS. 5 and 6. FIG. 9 shows in tabular form the set (remanent state) of the cores for each time step for the addition of two negative numbers as stated in Rule 2. It is not necessary here to describe in detail the state of each core for each time period because the reader may do this himself after a reading of the detailed description given previously. Note that since the number from the accumulator 29 is negative it will be in TWO's complement form and since the answer is negative, the answer will also be in TWO's complement form.

Reference to FIGS. 9 and 2 will show that at time $T_{20}$, the numbers have passed through the adder and a ZERO appears on line $X_{104}$ because the ping-pong circuit is not activated. The ZERO on line $X_{104}$ is EXCLUSIVE ORed against the ONE occurring on line $X_{108}$, which is the $P_7$ sign bit of the number supplied by the accumulator 29, resulting in a ONE set in core $C_{109}$ and a ZERO set in cores $C_{105}$ and $C_{123}$. Also, at time $T_{20}$, a ZERO is in core $C_{115}$ because there was not a one in either core $C_{106}$ or $C_{124}$ at time $T_9$. At time $T_{21}$, the ONE in core $C_{109}$ is EXCLUSIVE ORed against the ZERO in core $C_{115}$ resulting in a ONE set in core $C_{110}$ and a ZERO in cores $C_{116}$ and $C_{124}$. At time $T_{22}$, the ONE in core $C_{110}$ is transferred to the output line $X_{110}$ and appears there as a ONE corresponding to the sign position bit $P_7$. Therefore, the validity of Rule 2 has been shown.

FIG. 8 shows in tabular form the state of the cores comprising the adder when a positive and negative number are added together and the positive number is the greater and arrives from the memory 28 as stated in Rule 3. Reference to FIGS. 8 and 2 will show that at time $T_{20}$, the bits ($P_1$ to $P_6$) of the numbers being added have passed through the adder. A ONE appears on line $X_{104}$ at time $T_{20}$, because the ping-pong is activated, which is EXCLUSIVE ORed against the sign position bit $P_7$ of the number supplied by the accumulator 29 appearing on line $X_{108}$, which is a ONE, resulting in a ZERO set in cores $C_{105}$, $C_{109}$ and $C_{123}$. At time $T_{20}$, a ONE is not set into core $C_{115}$ because at time $T_{19}$, a ZERO set was in cores $C_{106}$ and $C_{124}$. At time $T_{21}$, the ZERO in cores $C_{105}$ and $C_{109}$ is EXCLUSIVE ORed against the ZERO in core $C_{115}$ resulting in a ZERO set in cores $C_{110}$, $C_{116}$, and $C_{24}$. At time $T_{22}$, the ZERO set of cores $C_{110}$ and $C_{116}$ is transferred to the output line $X_{110}$ where is appears as a ZERO corresponding to the sign position bit $P_7$. Therefore, Rule 3 is validated.

FIG. 7 shows the set of the cores when a positive and negative number are added, and the positive number arrives from the accumulator 28, as stated in Rule 4. Reference to FIGS. 2 and 7 will show that at time $T_{20}$, the bits ($P_1$ to $P_6$) of the two numbers have passed through the adder. At time $T_{20}$, a ZERO appears on line $X_{104}$ because the ping-pong was not turned on, which is EXCLUSIVE ORed against the sign position bit $P_7$ on line $X_{108}$ which is a ZERO because the number from the accumulator 29 is positive, resulting in a ZERO set in cores $C_{105}$, $C_{109}$ and $C^{123}$. At time $T_{20}$, a ZERO set is in core $C_{115}$ because a ZERO set was in cores $C_{106}$ and $C_{124}$ at time $T_{19}$ as shown in FIG. 7. At time $T_{21}$, the ZERO in cores $C_{105}$ and $C_{109}$ is EXCLUSIVE ORed against the ZERO in core $C_{115}$ resulting in a ZERO in cores $C_{110}$, $C_{116}$ and $C_{124}$. At time $T_{22}$, the ZERO set of cores $C_{110}$ and $C_{116}$ is transferred to output line $X_{110}$ where it appears as a ZERO corresponding to the sign position bit $P_7$. Accordingly Rule 4 is valid.

FIG. 10 shows in tabular form the set of the cores when a positive and negative word is added and the negative word is large and arrives from the accumulator 29 as stated in Rule 5. Reference to FIGS. 10 and 2 will show that at time $T_{20}$, the bits ($P_1$ to $P_6$) of both numbers have passed through the adder. At time $T_{20}$, a ONE appears on line $X_{104}$, because the ping-pong was activated, and is EXCLUSIVE ORed against the sign positive bit $P_7$ of the number supplied by the memory 29, which is a ONE because the number is negative, resulting in a ZERO set in cores $C_{105}$, $C_{109}$ and $C_{123}$. Reference to FIG. 10 shows that core $C_{106}$ contained a ONE at time $T_{19}$ which is transferred into core $C_{115}$ at time $T_{20}$. At time $T_{21}$, the ZERO in cores $C_{105}$ and $C_{109}$ is EXCLUSIVE ORed against the ONE in core $C_{115}$ resulting in a ONE in cores $C_{116}$ and $C_{124}$ and a ZERO in core $C_{110}$. At time $T_{22}$, the ONE in core $C_{116}$ is transferred to the output line $X_{110}$ where it appears as a ONE corresponding to the sign position bit $P_7$ as is shown in FIG. 10. Therefore, Rule 5 has been shown to be valid.

The rules given above are only valid when there is not an overflow, i.e., when neither of the input numbers nor the answer appearing on line $X_{110}$ is greater than unity. As was explained previously, the adder cannot handle a number greater than unity.

*The inhibitor circuit*

FIG. 11 shows in symbolic form and FIG. 11A shows in schematic form the inhibitor circuit used in the algebraic adder. Reference to FIG. 11 shows the inhibitor circuit comprises three magnetic cores $C_{117}$, $C_{118}$ and $C_{120}$ each having a substantially rectangular hysteresis loop characteristic. There are two inputs (STA pulse and memory 28) and a single output $X_{118}$. FIG. 11A shows that a split-winding circuit interconnects core $C_{118}$ to cores $C_{117}$ and $C_{120}$. The dots shown near the windings in FIG. 11A indicate that current into a dot terminal will set the core into the ZERO state. Conversely, a current flowing out of a dot terminal, sets the core into the ONE state. FIG. 11A shows that an STA pulse applied to windings 201 set core $C_{117}$ into the ONE state, and a pulse arriving from the memory 28 applied to the windings 203 will set core $C_{120}$ into the ONE state.

A ONE in core Core $C_{120}$ inhibits the transfer of a ONE from core $C_{117}$ to $C_{118}$. Assume that there is a ONE in cores $C_{117}$ and $C_{120}$. The transfer pulse $(n+1)$ is applied to terminal 208 creating a current I $(n+1)$ which divides into lines 210 and 211 as currents $I_1$ and $I_2$, respectively. Because a ONE is in both cores $C_{117}$ and $C_{120}$, the impedance presented by winding 202 of core $C_{117}$ to the current $I_1$ is equal to the impedance presented by windings 204 of core $C_{120}$ to the current $I_2$. Therefore, current $I_1$ is equal to current $I_2$. Accordingly, the magnetizing force produced by current $I_2$ passing through the winding 206 on core $C_{118}$ tending to switch the core $C_{118}$ into the ONE state is canceled by an equal and opposite magnetizing force produced by the equal current $I_1$ passing through the winding 205 on core $C_{118}$ that tends to switch the core $C_{118}$ into the ZERO state.

If a core is in the ZERO state and a current is applied to a winding that tends to switch the core into the ONE state, a large counter E.M.F. will be generated in the winding and the core will look like a relatively high impedance to the driving source. However, if the core is already in the ONE state when the current is applied, the counter E.M.F. will be small and the core will appear almost as a short circuit to the driving source.

Assume now that a ONE is in core $C_{117}$ of FIG. 11A and a ZERO is in core $C_{120}$. When the advance pulse $(n+1)$ is applied to the terminal 208, the current $I_2$ tends to switch core $C_{120}$ into the ZERO state. However, since core $C_{120}$ is already in the ZERO state, the impedance presented by the winding 204 to the current $I_2$ will be very small. The current $I_1$ tends to switch core $C_{117}$ into the ZERO state and since core $C_{117}$ is in the ONE state the impedance presented by the windings 202 to the current $I_1$ will be very large, as explained above. Since the windings 202 of core $C_{117}$ present a much higher impedance than the windings 204 of core $C_{120}$ to the flow of current, the current $I_2$ will be much larger than the current $I_1$. Therefore, the magnetic flux created by winding 206 of core $C_{118}$ due to the current $I_2$ and which tends to switch core $C_{118}$ into the ONE state will be much larger than the magnetic flux created by the current $I_1$ flowing through the winding 205 of core $C_{118}$ which tends to switch the core $C_{118}$ into the ZERO state. Consequently, core $C_{118}$ will be set into the ONE state. That is, the ONE that appeared in core $C_{117}$ has been transferred into core $C_{118}$.

When a ONE is in core $C_{120}$ and a ZERO in core $C_{117}$, the current $I_1$ will be much larger than current $I_2$. The larger $I_1$ current flowing through the windings 205 of core $C_{118}$ tend to switch core $C_{118}$ into the ZERO state. Therefore, in this case, the ONE in core $C_{120}$ is not transferred into core $C_{118}$.

The diodes 207 and 208 shown in FIG. 11A prevent current flow in lines 211 and 210 when information is read out of core $C_{118}$ into the output (not shown in FIG. 11A). This inhibitor circuit is described in the February 1956 issue of the Proceeding of the IRE on pages 154 to 162.

*The ping-pong circuit*

The ping-pong circuit is shown in symbolic diagram form in FIG. 12 and in schematic diagram form in FIG. 12A. Reference to these figures will show that the ping-pong circuit comprises two magnetic cores of substantially rectangular hysteresis loop characteristics $C_{125}$ and $C_{114}$. An input to the windings 215 of the core $C_{114}$ set that core into the ONE state. The *n* transfer pulse is applied to the windings 214 of the core $C_{114}$ and will switch the core $C_{114}$ back to the ZERO state. When this occurs, an output pulse is generated on the output winding 213, passes through the diode 220, and is seen as the output of the ping-pong. Also, the switching of core $C_{114}$ from the ONE into the ZERO state by the *n* transfer pulse, induces a current in the loop 218 that passes through the diode 217 and sets the core $C_{125}$ into the ONE state.

The next $(n+1)$ transfer pulse to occur is applied to winding 212 of the core $C_{125}$ and will switch that core into the ZERO state. When core $C_{125}$ is switched into the ZERO state, a current is induced in the loop 219 that passes through diode 216 and sets the core $C_{114}$ into the ONE state. The *n* and $(n+1)$ transfer pulses will continue this transferring of a ONE back and forth between cores $C_{125}$ and $C_{114}$ until the ping-pong circuit is turned off. As explained previously, the ping-pong can be turned off by simultaneously applying a pulse to a winding (not shown) on each core $C_{114}$ and $C_{125}$ that will simultaneously set a ZERO in each of the cores.

*The EXCLUSIVE OR circuits*

FIG. 13 shows in symbolic form, and FIG. 13A shows in schematic diagram form, the EXCLUSIVE OR circuits utilized in the adder as the second 23 and fourth 26 EXCLUSIVE OR circuits. An input pulse on winding 221 of the core $C_{112}$ shown in FIG. 13A sets that core into the ONE state and an input pulse on winding 223 of the core $C_{118}$ sets that core into the ONE state. Assume that a ONE is set in core $C_{112}$ and a ZERO in the core $C_{118}$. The next *n* transfer pulse that occurs is applied to the terminal 229 which creates a current $I_n$. The $I_n$ current divides into an $I_1$ current in line 231 and $I_2$ current in line 232. The $I_1$ current passes through the windings 222 of the core $C_{112}$ and tends to switch the core $C_{112}$ from the ONE state into the ZERO state. Since core $C_{118}$ is already in the ZERO state, the windings 224 will represent a very small impedance to the flow of the current $I_2$. Because the line 232 represents a smaller impedance to the flow of current than the line 231, the $I_2$ current will be larger than the $I_1$ current. The larger $I_2$ current flows through windings 226 and generates a magnetic flux in core $C_{119}$ that tends to place that core in the ZERO state. The smaller $I_1$ current flows through the windings 225 and generates a magnetic flux that tends to place the core $C_{119}$ into the ONE state. However, since the $I_2$ current is larger than the $I_1$ current, the magnetic flux created by the $I_2$ current will be larger than the magnetic flux created by the $I_1$ current and core $C_{119}$ will remain in the ZERO state.

The larger $I_2$ current also flows through windings 228 and generates a magnetic flux in core $C_{113}$ that tends to place that core into the ONE state. The smaller $I_1$ current flows through windings 227 and generates a smaller magnetic flux that tends to set a ZERO in core $C_{113}$. Since the magnetic flux created by the $I_2$ current is larger, the core $C_{113}$ is switched into the ONE state. That is, the ONE in core $C_{112}$ has been transferred to the core $C_{113}$.

From the above, it is obvious that had the ONE set been in core $C_{118}$ and a ZERO in core $C_{112}$, the current $I_1$ would be larger than the current $I_2$ resulting in a ONE in the core $C_{119}$ and a ZERO in core $C_{113}$. If a ONE set is in both cores $C_{118}$ and $C_{112}$, the $I_1$ current will be equal to the $I_2$ current and there will be no change in the set of either core $C_{119}$ or $C_{113}$. The $I_1$ current will also be equal to the $I_2$ current when a ZERO set is in cores $C_{112}$ and $C_{118}$.

The output windings (not shown) of the cores $C_{119}$ and $C_{113}$ are tied together and each core is read out by a transfer pulse (not shown) simultaneously.

FIGS. 14 and 14A show an EXCLUSIVE OR circuit having a feedback core $C_{122}$ in a feedback loop 34. This circuit is used as the first 21 and third 24 EXCLUSIVE OR circuits in the algebraic adder. Reference to FIG. 14A will show that, except for the extra core $C_{122}$ and the feedback loop 34, the circuit is identical to circuit shown in FIG. 13A. Note that the windings 241 and 242 of the feedback core $C_{122}$ are identical to the windings 239 and 240 on core $C_{104}$. Therefore, a ONE or a ZERO will be set into core $C_{122}$ whenever a ONE or a ZERO is set into the core $C_{104}$. That is, the set of cores $C_{104}$ and $C_{122}$ will always be the same. Accordingly, when a ONE appears in core $C_{103}$ and a ZERO in core $C_{101}$, a ONE will be transferred into cores $C_{104}$ and $C_{122}$ and a ZERO into core $C_{102}$ by the transfer pulse $(n+1)$. Conversely, when a ONE is in the core $C_{101}$ and a ZERO in the core $C_{103}$, the next $(n+1)$ pulse applied to terminal 251 will result in a ONE in the core $C_{102}$ and a ZERO set in the cores $C_{104}$ and $C_{122}$. The output windings (not shown) of cores $C_{104}$ and $C_{102}$ are tied together and each core is read out simultaneously by a transfer pulse (not shown). At the same time that cores $C_{104}$ and $C_{102}$ are being read out, the same transfer pulse (not shown) is applied to the core $C_{122}$ and if core $C_{122}$ contained a ONE set, it will be switched into the ZERO state which induces a current $I_t$ in the feedback loop 34 that sets a ONE into the core $C_{103}$. Otherwise, the operation of the EXCLUSIVE OR circuit shown in FIG. 14A is the same as the EXCLUSIVE OR circuit shown in FIG. 13A. The EXCLUSIVE OR circuit shown in FIG. 13 is described in detail in the February 1956 issue of Proceedings of the IRE, pages 154 to 162.

The detailed description given above shows that high reliability magnetic core circuits may be combined to form an algebraic adder that uses a minimum number of such magnetic cores resulting in even greater reliability. It has been shown that the adder circuit gives the sign value of the output and also rounds off the output number. The number of magnetic cores needed in the circuit is minimized by overlapping the functions performed by certain cores.

What is claimed is:

1. A binary algebraic adder comprising: at least a first and second source of binary numbers, sign determining means adapted to receive and determine the sign of said first source of numbers, first means coupled to said first source of numbers and said sign determining means and adapted to provide an output which is the result of one's complementing the first least significant ONE bit and all lower order ZEROS of a negative number supplied by said first source of numbers and further adapted to provide an output which is the one's complement of a positive number supplied by said first source of numbers, and second means adapted to receive said second source of numbers and said output of said first means for adding the numbers supplied by said second source of numbers to said output of said first means.

2. A binary algebraic adder comprising: a first and second source of binary numbers, magnetic core sign determining means adapted to receive and determine the sign of said first source of numbers, first magnetic core means coupled to said first source of numbers and said sign determining means and adapted to provide an output which is the result of one's complementing the first least significant ONE bit and all lower order ZEROS of a negative number supplied by said first source of numbers and further adapted to provide an output which is the one's complement of a positive number supplied by said first source of numbers, and second magnetic core means adapted to receive said second source of numbers and said output of said first means for adding the numbers supplied by said second source of numbers to said output of said first means.

3. A serial binary adder circuit comprising: a first and second source of binary numbers; sign determining means adapted to receive and determine the sign of the numbers supplied by said first source of numbers; complementing means coupled to said first source of numbers and to said sign determining means and adapted to provide an output binary number which is the number supplied by said first source of numbers but with the first least significant ONE bit and all lower order ZEROS one's complemented when the number is negative and adapted to provide an output that is the one's complement when the number supplied by said first source is positive; a first EXCLUSIVE OR circuit having a first input coupled to the output of said complementing means, a second input coupled to said second source of binary numbers and having an output; a second EXCLUSIVE OR circuit having a first input coupled to the output of said first EXCLUSIVE OR circuit, a second input and an output; and delay means coupled between the output of said complementing means and the second input of said second EXCLUSIVE OR circuit; said first and second EXCLUSIVE OR circuits and said delay means adapted to add the binary numbers supplied by said second source of numbers to the output of said complementing means such that the sum or difference of the numbers provided by the first and second source of numbers appears on the output of said EXCLUSIVE OR circuit.

4. A serial binary adder circuit comprising: at least a first and second source of binary numbers; sign determining means adapted to receive and determine the sign of the numbers supplied by said first source of numbers; magnetic core means coupled to said first source of numbers and to said sign determining means and adapted to provide an output binary number which is the number supplied by said first source of numbers but with the first least significant ONE bit and all lower order ZEROS one's complemented when the number is negative and adapted to provide an output that is the one's complement when the number supplied by said first source is positive; a first magnetic core EXCLUSIVE OR circuit having a first input coupled to the output of said magnetic core means, a second input coupled to said second source of binary numbers and having an output; a second magnetic core EXCLUSIVE OR circuit having a first input coupled to the output of said first EXCLUSIVE OR circuit, a second input and an output; and magnetic core delay means coupled between the output of said first magnetic core means and the second input of said second EXCLUSIVE OR circuit; said first and second EXCLUSIVE OR circuits and said delay means adapted to add the binary numbers supplied by said second source of numbers to the output of said magnetic core means.

5. A serial algebraic adder circuit comprising: a first and second source of serial binary numbers; each said number having a sign position bit that indicates the sign of the binary number; first means adapted to receive and determine the sign of the numbers supplied by said first source of numbers; said first means adapted to provide an output of a series of pulses, each of which occur simultaneously in time with the bits of the serial binary numbers, in response to a positive number supplied by said first source of numbers or in response to a negative number supplied by said first source when the adder circuit is to perform subtraction; second means coupled to said first source of numbers and adapted to receive said series of pulses generated by said first means to provide an output which is the result of one's complementing the number supplied by said first source of numbers in response to a series of pulses generated by said first means and to provide an output which is the result of one's complementing the first least significant ONE bit and all lower order ZEROS of the number supplied by said first source of numbers in response to an absence of a series of pulses generated by said first means; and third means coupled to said output of said second means and to said second source of numbers for adding the binary numbers supplied by said second source to said output of said second means to provide an output which is the sum or difference of the serially binary numbers supplied by said first and second sources of numbers; said third means adapted to provide a sign position bit that indicates the sign of the number appearing on said output of said third means.

6. A serial algebraic adder circuit comprising: a first and second source of serial binary numbers; each said number having a sign position bit that indicates the sign of the binary number; first magnetic core means adapted to receive and determine the sign of the numbers supplied by said first source of numbers; said first magnetic core means adapted to provide an output of a series of pulses, each of which occur simultaneously in time with the bits of serial binary numbers, whenever the sign of a number supplied by said first source of numbers is positive or when the sign is negative and the adder circuit is to perform subtraction; second magnetic core means coupled to said first source of numbers and adapted to receive said series of pulses generated by said first magnetic core means to provide an output which is the result of one's complementing the number supplied by said first source of numbers whenever a series of pulses are generated by said first means and to provide an output which is the result of one's complementing the first least significant ONE bit and all lower order ZEROS of the number supplied by said first source of numbers when a series of pulses are not generated by said first means; and third magnetic core means coupled to said output of said second means and to said second source of numbers for adding the binary numbers supplied by said second source to said output of said second means to provide an output which is the sum or difference of the serially binary numbers supplied by said first and second sources of numbers; said third means adapted to provide a sign position bit that indicates the sign of the number appearing on said output of said third means.

7. A serial algebraic circuit comprising: a first and second source of serial binary numbers each adapted to provide a sign position bit indicative of the sign of the binary numbers; first means coupled to said first source of binary numbers for determining the sign of the numbers and adapted to provide an output of a series of pulses, that occur simultaneously in time with the bits of the numbers supplied by said first source, in response to a positive number supplied by said first source or in response to a negative number and the adder is to perform subtraction; second means coupled to said first source of numbers and to the output of said first means and adapted to provide an output which is the result of one's complementing the number supplied by said first source of numbers in response to a series of pulses appearing on said output of said first means and adapted to provide an output which is the result of one's complementing the first least significant ONE bit and all lower orders ZEROS of the number supplied by said first source in response to the absence of pulses appearing on said output of said first means; a first EXCLUSIVE OR circuit having a first input terminal connected to said output terminal of said second means, a second input terminal connected to said second source of numbers and an output terminal; delay means having an input and an output terminal; said input terminal of said delay means coupled to said output of said second means; and a second EXCLUSIVE OR circuit having a first input terminal connected to said output terminal of said first EXCLUSIVE OR circuit, a second input terminal connected to said output of said delay means and to said second source of numbers, an output terminal and feedback from within said second EXCLUSIVE OR circuit to its second input terminal; said first and second EXCLUSIVE OR circuits and said delay means adapted to add the binary numbers supplied by said first source of numbers and said output of said second means to produce, on said output terminal of said second EXCLUSIVE OR circuit, an output which is the sum or difference of the serial binary numbers supplied by said first and second source of numbers and also adapted to provide a sign position bit that indicates the sign of the number appearing on the output of said EXCLUSIVE OR circuit.

8. The combination defined in claim 7 wherein said first and second means each include magnetic cores having a substantially rectangular hysteresis loop characteristic.

9. The combination defined in claim 7 further including a source of pulses to provide a pulse for rounding off the output appearing on the output terminal of said third EXCLUSIVE OR circuit, said pulse source coupled to the input of said delay means and to the first input of said third EXCLUSIVE OR circuit.

10. A serial algebraic adder comprising: a first and second source of serial binary numbers; said first and second source of numbers adapted to provide a sign position bit that indicates the sign of each number; a first pulse source to provide a pulse for each binary number supplied by said first source of numbers; a second pulse source to provide a pulse whenever the algebraic adder is to perform subtraction; an inhibitor circuit having a first input terminal coupled to said first pulse source, a second input terminal coupled to said first source of numbers and adapted to provide an output pulse on an output terminal in response to a pulse appearing on its first input terminal during the absence of a pulse on its second input terminal; pulse generating means having a first input terminal coupled to said second pulse source, a second input terminal coupled to said output terminal of said inhibitor circuit and an output terminal; said pulse generating means adapted to produce a series of pulses on its said output terminal, that occur simultaneously in time with the bits of the binary numbers supplied by said first and second source of numbers, in response to a single pulse appearing on either its first or second input terminal; EXCLUSIVE ORing means having a first input terminal coupled to said first source of numbers and to said first pulse source, a second input terminal coupled to said output of said pulse generating means and to said first pulse source, and adapted to provide on an output terminal a binary number which is the result of one's complementing the serial binary number supplied by said first source of numbers in response to a series of pulses appearing on said output terminal of said pulse generating means, and adapted to provide an output which is the result of one's complementing the first least significant ONE bit and all lower ZEROS of the number supplied by said first source of numbers in response to the absence of a series of pulses appearing on said output terminal of said pulse generating means; and adding means having a first input terminal coupled to said output terminal of said EXCLUSIVE ORing means and a second input terminal coupled to said second source of numbers for combining the numbers supplied by said second source of numbers with said output of said EXCLUSIVE ORing means to provide an output number which is the sum or difference of the binary numbers supplied by said first and second source of numbers.

11. The combination defined in claim 10 wherein said inhibitor and pulse generating means each include magnetic cores having a substantially rectangular hysteresis loop characteristic.

12. A serial algebraic circuit comprising: a first and second source of serial binary numbers; said first and second source of numbers adapted to provide a sign position bit that indicates the sign of each binary number; a first pulse source to provide a pulse for each binary number supplied by said first source of numbers; a second pulse source to provide a pulse whenever the serial adder is to perform subtraction; sign determining means having a first input coupled to said first pulse source, a second input coupled to said first source of numbers, a third input coupled to said second pulse source and an output terminal; said sign determining means adapted to produce a series of pulses on its output terminal in response to a positive number from said first source of binary numbers or in response to a negative number from said first source of numbers and a pulse applied to said third input of said sign determining means from said second pulse source; EXCLUSIVE ORing means having a first input coupled to said first source of numbers and to said first pulse source, a second input coupled to the output of said sign determining means and to said first pulse source, and adapted to provide on an output terminal a binary number which is the result of one's complementing the binary numbers supplied by said first source of numbers in response to a series of pulses appearing on the output of said determining means; and adapted to provide an output which is the result of one's complementing the first least significant ONE bit and all lower order ZEROS of the serial binary numbers supplied by said first source of numbers in response to the absence of pulses on said output of said sign determining means; and adding means having a first input coupled to the output of said EXCLUSIVE ORing means and a second input coupled to said second source of numbers for combining the binary numbers supplied by said second source of numbers with said output of said EXCLUSIVE ORing means to provide on an output terminal the sum or difference of the serial binary numbers supplied by said first and second source of numbers; said adding means adapted to provide a sign position bit that indicates the sign of the result appearing on the output of said adding means; said adding means also adapted to provide on its said output terminal a number which is the two's complement of the result of the addition or subtraction of the number supplied by the said first and second source of numbers when said result is a negative number.

13. The combination defined in claim 12 wherein said EXCLUSIVE ORing means provides feedback to its said second input terminal.

14. A serial algebraic adder circuit comprising: a first and second source of serial binary numbers; a first pulse source to provide a pulse for each binary number applied by said first source of numbers; a second pulse source to provide a pulse whenever the algebraic adder is to perform subtraction; magnetic core sign determining means having a first input coupled to said first pulse source, a second input terminal coupled to said first source of binary numbers and a third input terminal coupled to said second pulse source; said sign determining means adapted to produce a series of pulses on an output terminal in response to a positive number supplied by said first source of numbers or in response to a positive number supplied by said first source and a pulse appearing on said third input terminal of said sign determining means from said second pulse source; a first EXCLUSIVE ORing means having a first input coupled to said first source of numbers and to said first pulse source, a second input coupled to the output of said sign determining means and to said first pulse source; said first EXCLUSIVE ORing means adapted to provide on an output terminal a binary number which is the result of one's complementing the serial binary number supplied by said first source of numbers in response to a series of pulses appearing on the output terminal of said sign determining means and adapted to provide a binary number on said output which is the result of one's complementing the first least significant ONE bit in all lower order ZEROS of the serial binary numbers supplied by said first source of numbers in response to the absence of pulses appearing on the output of said sign determining means; second EXCLUSIVE ORing means having a first input connected to said output terminal of said first EXCLUSIVE ORing means, a second input coupled to said second source of serial binary numbers and an output terminal; delay means having an input terminal and an output terminal; said input terminal of said delay means coupled to said output terminal of said first EXCLUSIVE ORing means; third EXCLUSIVE ORing means having a first input coupled to said output terminal of said second EXCLUSIVE ORing means, a second input coupled to said output terminal of said delay means and to said second source of binary numbers, an output terminal, and having feedback to its second input terminal; said second and third EXCLUSIVE ORing means and said delay means adapted to add the binary numbers supplied by said second source of numbers with said output of said first EXCLUSIVE ORing means to produce, on the output terminal of said third EXCLUSIVE ORing means, a binary number which is the sum or difference of the serial binary numbers supplied by said first and second source of serial binary numbers.

15. The combination defined in claim 14 further including a third pulse source to provide a pulse for rounding off the output of said third EXCLUSIVE ORing means, said third pulse source being coupled to said first input of said third EXCLUSIVE ORing means and said input of said delay means.

16. A serial algebraic adder comprising: a first and second source of serial binary numbers; said first and second source of numbers adapted to provide a sign position bit that indicates the sign of each number; a first pulse source to provide a pulse for each number supplied by said first source; a second pulse source adapted to provide a pulse whenever the algebraic adder is to perform subtraction; an inhibitor circuit having a first input coupled to said first pulse source, a second input coupled to said first source of numbers and adapted to provide an output pulse on an output terminal in response to a pulse appearing on its first input during the absence of a pulse on its second input; pulse generating means having a first input coupled to said second pulse source, a second input coupled to the output of said inhibitor circuit and having an output terminal; said pulse generating means adapted to provide, on its output terminal, a series of pulses that occur simultaneously in time with the serial binary numbers supplied by said first and second sources in response to a pulse appearing on either its first or second input; first EXCLUSIVE ORing means having a first input coupled to said first source of numbers and to said first pulse source, a second input coupled to the output of said pulse generating means and to said first pulse source and an output terminal; said first EXCLUSIVE ORing means having feedback to its said second input and adapted to provide on its said output terminal a binary number which is the result of one's complementing the number supplied by said first source of numbers in response to a series of pulses appearing on the output of said pulses generating means and to provide an output which is the result of one's complementing the first least significant ONE bit and any lower ZEROS of the number supplied by said first source of numbers in response to the absence of a series of pulses appearing on the output of said pulse generating means; second EXCLUSIVE ORing means having a first input coupled to the output of said first EXCLUSIVE ORing means, a second input coupled to said second source of numbers and an output terminal; delay means having an input and an output terminal; said input terminal of said delay means coupled to the output terminal of said first EXCLUSIVE ORing means; third EXCLUSIVE ORing means having a first input coupled to the output of said second EXCLUSIVE ORing means, a second input coupled to the output of said delay means and to said second source of serial binary numbers, and output terminal and feedback to its second input terminal; said second and third EXCLUSIVE ORing means and said delay means adapted to combine the binary number supplied by said second source of numbers to said output of said first EXCLUSIVE ORing means to produce, on said output terminal of said third EXCLUSIVE ORing means, a binary number which is the sum or difference of the serial binary numbers supplied by said first and second source of numbers, to provide a sign position bit that indicated the sign of the number appearing on the output terminal of said third EXCLUSIVE ORing means and to provide a number which is the two's complement of the result of the addition and subtraction of the numbers supplied by said first and second source of numbers when said result is a negative number.

No references cited.

MALCOLM A. MORRISON, *Primary Examiner.*

ROBERT C. BAILEY, *Examiner.*

T. M. ZIMMER, M. SPIVAK, *Assistant Examiners.*